(12) United States Patent
Yoshida et al.

(10) Patent No.: US 8,913,289 B2
(45) Date of Patent: Dec. 16, 2014

(54) CONTROL DEVICE, IMAGE FORMING SYSTEM AND PROGRAM FOR CONTROLLING TOTAL TONER AMOUNT

(75) Inventors: Makoto Yoshida, Kanagawa (JP); Hiroaki Suzuki, Chiba (JP)

(73) Assignee: Ricoh Company, Limited, Tokyo (JP)

(*) Notice: Subject to any disclaimer, the term of this patent is extended or adjusted under 35 U.S.C. 154(b) by 15 days.

(21) Appl. No.: 13/616,355

(22) Filed: Sep. 14, 2012

(65) Prior Publication Data

US 2013/0070268 A1    Mar. 21, 2013

(30) Foreign Application Priority Data

Sep. 16, 2011 (JP) ................................ 2011-203660
Aug. 15, 2012 (JP) ................................ 2012-180283

(51) Int. Cl.
*H04N 1/60*    (2006.01)

(52) U.S. Cl.
CPC ........................................ *H04N 1/60* (2013.01)
USPC ............ 358/1.9; 358/2.1; 358/3.06; 358/504; 358/518; 358/1.2

(58) Field of Classification Search
None
See application file for complete search history.

(56) References Cited

U.S. PATENT DOCUMENTS

| | | | | |
|---|---|---|---|---|
| 7,407,242 B2* | 8/2008 | Piatt et al. | ........................... | 347/7 |
| 7,492,484 B2* | 2/2009 | Okuyama | ..................... | 358/3.23 |
| 7,742,204 B2* | 6/2010 | Kuhn et al. | .................... | 358/504 |
| 8,194,980 B2* | 6/2012 | Sakurai | .......................... | 382/167 |
| 8,208,827 B2* | 6/2012 | Sakata | ............................ | 399/82 |
| 8,493,620 B2* | 7/2013 | Iguchi | ............................ | 358/1.9 |
| 8,619,329 B2* | 12/2013 | Lin | ............................... | 358/3.06 |
| 2005/0243337 A1* | 11/2005 | Kuhn et al. | ..................... | 358/1.9 |
| 2007/0058188 A1 | 3/2007 | Nakahara | | |
| 2011/0235062 A1* | 9/2011 | Suzuki | ........................... | 358/1.2 |
| 2012/0062956 A1 | 3/2012 | Kitagawa et al. | | |
| 2012/0063802 A1 | 3/2012 | Suzuki et al. | | |
| 2012/0229819 A1* | 9/2012 | Koyatsu et al. | ................ | 358/1.1 |

FOREIGN PATENT DOCUMENTS

| | | |
|---|---|---|
| JP | 2005-311558 | 11/2005 |
| JP | 2007-049338 | 2/2007 |
| JP | 2007-082177 | 3/2007 |

* cited by examiner

*Primary Examiner* — Dung Tran
(74) *Attorney, Agent, or Firm* — Harness, Dickey & Pierce, P.L.C.

(57) ABSTRACT

A control device according to the present invention is a control device that controls a print device that forms an image on a recording medium based on image data in which density values of multiple colors are defined every pixel, including: a stored color setting unit that sets a stored color indicating a color of which a toner amount is not restricted in each object indicating an area in which a predetermined type of image in the image data is drawn, in response to designation from a user; and a determination unit that determines density values of each of colors, in the each object, other than the stored color, such that a total sum of the density values of the colors is within a value subtracting a density value of the stored color from a reference value.

14 Claims, 22 Drawing Sheets

FIG.1
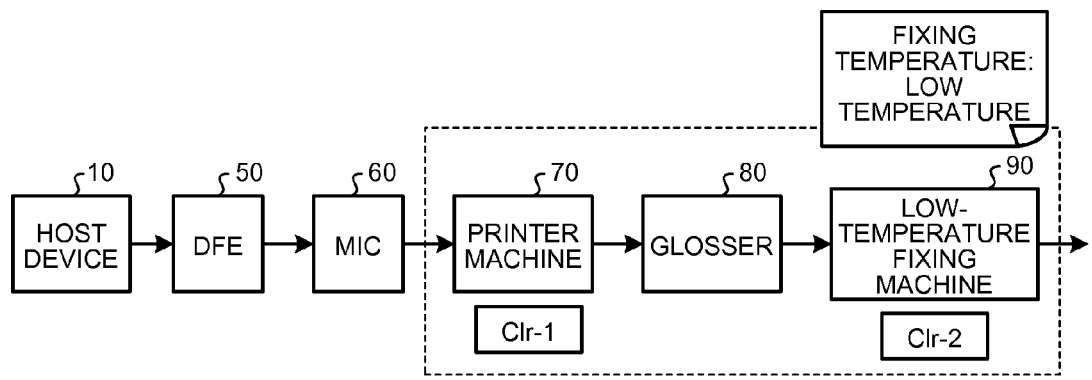
FIG.2
IMAGE DATA OF COLOR PLANE
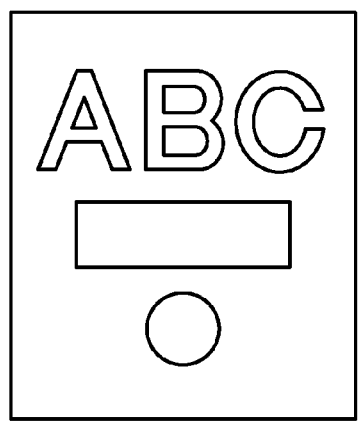
FIG.3
| GLAZE CONTROL NAME | GLAZE | DEVIATION |
|---|---|---|
| PREMIUM GLOSS | Gs≥80 | ΔGs≤10 |
| GLOSS | Gs=Gs (GLOSS) | ΔGs≤10 |
| MATT | Gs=Gs (1C30%MATT) | ΔGs≤10 |
| PREMIUM MATT | Gs≤10 | ΔGs≤10 |

IMAGE DATA OF GLAZE CONTROL PLANE

: AREA IN WHICH PG IS DESIGNATED (DENSITY VALUE 98%)

: AREA IN WHICH G IS DESIGNATED (DENSITY VALUE 90%)

: AREA IN WHICH M IS DESIGNATED (DENSITY VALUE 16%)

IMAGE DATA OF CLEAR PLANE

| TYPE OF SURFACE EFFECT DESIGNATED BY USER | DENSITY VALUE OF GLAZE CONTROL PLANE (%) |
|---|---|
| PG | 98% |
| G | 90% |
| M | 16% |
| PM | 6% |

| DRAWING OBJECT | COORDINATE | DENSITY VALUE |
|---|---|---|
| A, B, C | (x1,y1)-(x2,y2) | 98% |
| (QUADRANGLE) | (x3,y3)-(x4,y4) | 90% |
| ... | ... | ... |

FIG.15

| DENSITY (%) | DENSITY REPRESENTATIVE VALUE | NUMERICAL VALUE RANGE | | EFFECT | GLOSSER ON/OFF (ON/OFF INFORMATION) | CLEAR TONER PLANE 1 (PRINTER MACHINE) | CLEAR TONER PLANE 2 (LOW-TEMPERATURE FIXING MACHINE) |
|---|---|---|---|---|---|---|---|
| 98% | 250 | 248 | 255 | PREMIUM GLOSS TYPE A | ON | INVERSE MASK A | NO DATA |
| 96% | 245 | 243 | 247 | PREMIUM GLOSS TYPE B | ON | INVERSE MASK B | NO DATA |
| 94% | 240 | 238 | 242 | PREMIUM GLOSS TYPE C | ON | INVERSE MASK C | NO DATA |
| 92% | 235 | 233 | 237 | RESERVED | | | |
| 90% | 230 | 228 | 232 | GLOSS TYPE 1 | OFF | INVERSE MASK 1 | NO DATA |
| 88% | 224 | 222 | 227 | GLOSS TYPE 2 | OFF | INVERSE MASK 2 | NO DATA |
| 86% | 219 | 217 | 221 | GLOSS TYPE 3 | OFF | INVERSE MASK 3 | NO DATA |
| 84% | 214 | 212 | 216 | GLOSS TYPE 4 | OFF | INVERSE MASK 4 | NO DATA |
| 82% | 209 | 207 | 211 | RESERVED | | | |
| 46% | 117 | 115 | 119 | RESERVED | | | |
| 44% | 112 | 110 | 114 | WATERMARKED CHARACTER 3 (XXX) | OFF | NO DATA | TILE CHARACTER STRING 3 |
| 42% | 107 | 105 | 109 | WATERMARKED CHARACTER 2 (COPY PROHIBITED) | | NO DATA | TILE CHARACTER STRING 2 |
| 40% | 102 | 100 | 104 | WATERMARKED CHARACTER 1 (SAMPLE) | | NO DATA | TILE CHARACTER STRING 1 |
| 38% | 97 | 95 | 99 | RESERVED | | | |
| 36% | 92 | 90 | 94 | RESERVED | | | |
| 34% | 87 | 85 | 89 | WOVEN PATTERN 3 (XXX) | | NO DATA | TILE WOVEN 3 |
| 32% | 82 | 80 | 84 | WOVEN PATTERN 2 (LATTICE) | | NO DATA | TILE WOVEN 2 |
| 30% | 76 | 74 | 79 | WOVEN PATTERN 1 (WAVE) | | NO DATA | TILE WOVEN 1 |
| 28% | 71 | 69 | 73 | RESERVED | | | |
| 26% | 66 | 64 | 68 | RESERVED | | | |
| 24% | 61 | 59 | 63 | TOUCH PATTERN TYPE 3 (HARSH) | | NO DATA | TILE MESH DESIGN 3 |
| 22% | 56 | 54 | 58 | TOUCH PATTERN TYPE 2 (MEDIUM) | | NO DATA | TILE MESH DESIGN 2 |
| 20% | 51 | 49 | 53 | TOUCH PATTERN TYPE 1 (FINE) | | NO DATA | TILE MESH DESIGN 1 |
| 18% | 46 | 44 | 48 | RESERVED | | | |
| 16% | 41 | 39 | 43 | MATT TYPE 4 | OFF | HALFTONE 4 | NO DATA |
| 14% | 36 | 34 | 38 | MATT TYPE 3 | OFF | HALFTONE 3 | NO DATA |
| 12% | 31 | 29 | 33 | MATT TYPE 2 | OFF | HALFTONE 2 | NO DATA |
| 10% | 25 | 23 | 28 | MATT TYPE 1 | OFF | HALFTONE 1 | NO DATA |
| 8% | 20 | 18 | 22 | RESERVED | | | |
| 6% | 15 | 13 | 17 | PREMIUM MATT TYPE C | ON&OFF | NO DATA | SOLID |
| 4% | 10 | 8 | 12 | PREMIUM MATT TYPE B | ON&OFF | NO DATA | SOLID |
| 2% | 5 | 1 | 7 | PREMIUM MATT TYPE A | ON&OFF | NO DATA | SOLID |
| 0% | 0 | 0 | 0 | NOTHING | OFF | NO DATA | NO DATA |

| OBJECT | COLOR MATERIAL DESIGNATION INFORMATION | | | | |
|---|---|---|---|---|---|
|  | C | M | Y | K | Clr |
| CHARACTER | NON-STORED | NON-STORED | NON-STORED | STORED | NON-STORED |
| LINE | NON-STORED | STORED | NON-STORED | NON-STORED | NON-STORED |
| GRAPHIC | NON-STORED | NON-STORED | NON-STORED | NON-STORED | NON-STORED |
| NATURAL IMAGE | NON-STORED | NON-STORED | NON-STORED | NON-STORED | STORED |

| | COLOR MATERIAL DESIGNATION INFORMATION | | | | |
|---|---|---|---|---|---|
| OBJECT | C | M | Y | K | Clr |
| CHARACTER | NON-STORED | NON-STORED | NON-STORED | NON-STORED | STORED |
| LINE | NON-STORED | NON-STORED | NON-STORED | NON-STORED | STORED |
| GRAPHIC | NON-STORED | NON-STORED | NON-STORED | NON-STORED | STORED |
| NATURAL IMAGE | NON-STORED | NON-STORED | NON-STORED | NON-STORED | STORED |

FIG.31

| OBJECT | COLOR MATERIAL DESIGNATION INFORMATION | | | | |
|---|---|---|---|---|---|
| | C | M | Y | K | Clr |
| CHARACTER | NON-STORED | NON-STORED | NON-STORED | STORED | NON-STORED |
| LINE | NON-STORED | NON-STORED | NON-STORED | STORED | NON-STORED |
| GRAPHIC | NON-STORED | NON-STORED | NON-STORED | STORED | NON-STORED |
| NATURAL IMAGE | NON-STORED | NON-STORED | NON-STORED | STORED | NON-STORED |

FIG.32

| OBJECT | COLOR MATERIAL DESIGNATION INFORMATION | | | | |
|---|---|---|---|---|---|
| | C | M | Y | K | Clr |
| CHARACTER | NON-STORED | NON-STORED | NON-STORED | STORED | STORED |
| LINE | NON-STORED | NON-STORED | NON-STORED | STORED | STORED |
| GRAPHIC | NON-STORED | NON-STORED | NON-STORED | STORED | STORED |
| NATURAL IMAGE | NON-STORED | NON-STORED | NON-STORED | STORED | STORED |

CONTROL DEVICE, IMAGE FORMING SYSTEM AND PROGRAM FOR CONTROLLING TOTAL TONER AMOUNT

CROSS-REFERENCE TO RELATED APPLICATIONS

The present application claims priority to and incorporates by reference the entire contents of Japanese Patent Application No. 2011-203660 filed in Japan on Sep. 16, 2011 and Japanese Patent Application No. 2012-180283 filed in Japan on Aug. 15, 2012.

BACKGROUND OF THE INVENTION

1. Field of the Invention

The present invention relates to a control device, an image forming system and a computer program product.

2. Description of the Related Art

In the related art, it is known that, in an image forming device such as a printer and a copying machine, if the used amount of color material (i.e. recording material) such as a toner and an ink is excessive, for example, image quality degrades. For example, in an electrophotography image forming device, if the used amount of toner is excessive, a fixing trouble or transcription trouble (i.e. uneven color) is likely to occur.

It is known that the above problem can be solved by suppressing the total amount of color material, which is used to draw one pixel, to be equal to or less than a predetermined restriction value (i.e. total amount restriction). For example, Japanese Laid-open Patent Publication No. 2005-311558 discloses a technique of determining a restriction value based on the total sum of the density values of colors of pixels included in a restriction target area, printing conditions, the total sum of the density values of colors of pixel values included in a peripheral area, and so on.

Here, in total amount restriction in the related art, since common restriction is performed on the color material of each color (i.e. the reduction of each color material is commonly set), there is a problem that the color expressiveness degrades depending on the type of an image to be displayed (e.g. natural image).

The present invention is made in view of the above and it is an object of the present invention to provide a control device, image forming system and computer program product that can improve image quality.

SUMMARY OF THE INVENTION

It is an object of the present invention to at least partially solve the problems in the conventional technology.

A control device that controls a print device that forms an image on a recording medium based on image data in which density values of multiple colors are defined every pixel, the control device comprising: a stored color setting unit configured to set a stored color indicating a color of which a toner amount is not restricted in each object indicating an area in which a predetermined type of image in the image data is drawn, in response to designation from a user; and a determination unit configured to determine density values of each of colors, in the each object, other than the stored color, such that a total sum of the density values of the colors is within a value subtracting a density value of the stored color from a reference value.

An image forming system comprising a print device that forms an image on a recording medium based on image data in which density values of multiple colors are defined every pixel, and a control device that controls the print device.

The control device comprises: a stored color setting unit configured to set a stored color indicating a color of which a toner amount is not restricted in each object indicating an area in which a predetermined type of image in the image data is drawn, in response to designation from a user; and a determination unit configured to determine density values of each of colors, in the each object, other than the stored color, such that a total sum of the density values of the colors is within a value subtracting a density value of the stored color from a reference value.

A computer program product comprising a non-transitory computer-usable medium having program that causes a computer held in a control device that controls a print device that forms an image on a recording medium based on image data in which density values of multiple colors are defined every pixel, to execute: a stored color setting step of setting a stored color indicating a color of which a toner amount is not restricted in each object indicating an area in which a predetermined type of image in the image data is drawn, in response to designation from a user; and a determining step of determining density values of each of colors, in the each object, other than the stored color, such that a total sum of the density values of the colors is within a value subtracting a density value of the stored color from a reference value.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 1 is a view exemplifying a configuration of an image forming system according to the present embodiment;

FIG. 2 is a view illustrating an example of image data of color plane;

FIG. 3 is a view exemplifying types of surface effects related to existence or non-existence of glaze;

FIG. 15 is a view exemplifying a data structure of a surface effect selection table;

FIG. 31 is a view illustrating a display example of the setting results in the stored color setting unit; and FIG. 32 is a view illustrating a display example of the setting results in the stored color setting unit.

DETAILED DESCRIPTION OF THE PREFERRED EMBODIMENTS

Figure 4:
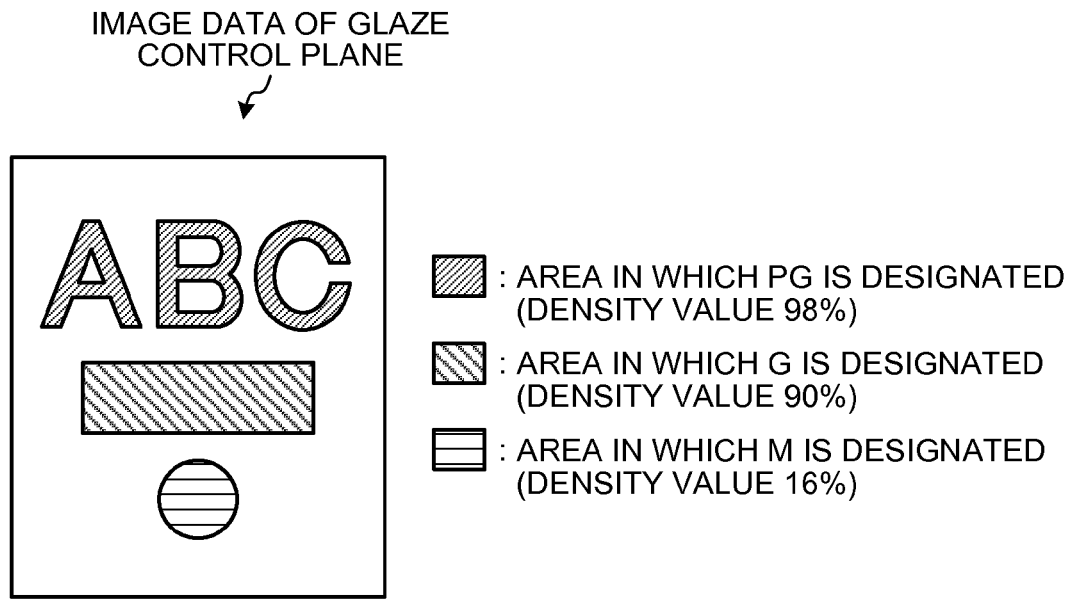
FIG. 4 is a view illustrating image data of glaze control plane as an image.

In the following, embodiments of a control device, image forming system and computer program product according to the present invention will be explained in detail with reference to the accompanying drawings.

First Embodiment

FIG. 1 is a block diagram illustrating a schematic configuration example of an image forming system according to the present embodiment. In the present embodiment, the image forming system is configured with a DFE (Digital Front End) 50 (hereinafter referred to as "DFE 50"), an MIC (Mechanism I/F Controller) 60 (hereinafter referred to as "MIC 60"), a printer machine 70, and a glosser 80 and a low-temperature fixing machine 90 as postprocessors. The DFE 50 communicates with the printer machine 70 via the MIC 60 and controls an image formation in the printer machine 70. Also, the DFE 50 is connected to a host device 10 such as a PC (Personal Computer), and receives image data from the host device 10, generates image data to form a toner image based on each toner of CMYK and clear toner in the printer machine 70 using the image data, and transmits this to the printer machine 70 via the MIC 60. The printer machine 70 mounts at least each toner of CMYK and the clear toner, where image forming units including a photosensitive drum, charger, developing unit and photosensitive-element cleaner, an exposing unit and a fixing machine are mounted for each toner.

Here, the clear toner is a transparent (or colorless) toner not including a color material. Also, the "transparent (or colorless)" indicates that, for example, the transmittance is 70% or more.

The printer machine 70 forms a toner image based on each toner on the photosensitive drum by radiating an optical beam from the exposing unit, in response to the image data transmitted from the DFE 50 via the MIC 60, and transfers this to a recording medium and fixes this by heating and pressurization at a temperature within a predetermined range (i.e. normal temperature) in the fixing machine. By this means, the image is formed on a transfer paper. A configuration of such the printer machine 70 is well-known, and therefore its specific explanation will be omitted. The recording medium is not limited to a paper but may be a synthetic paper, plastic, and so on.

The glosser 80 is controlled to be "ON" or "OFF" by On-Off information designated from the DFE 50, and refixes the image formed on the transfer paper in the printer machine 70, at high temperature and high pressure. By this means, the total attachment amount of the toners of pixels, to which the toners equal to or greater than a predetermined amount are attached in the whole image formed on the transfer paper, are uniformly compressed. In the low-temperature fixing machine 90, image forming units including a photosensitive drum, charger, developing unit and photosensitive-element cleaner for the clear toner, an exposing unit and a fixing machine to fix the clear toner are mounted, and, to use the low-temperature fixing machine 90, image data of clear toner plane (described later) generated by the DFE 50 is input. In a case where the DFE 50 generates the image data of clear toner plane (i.e. clear toner plane data) to be used by the low-temperature fixing machine 90, the low-temperature fixing machine 90 forms a toner image by the clear toner, overlaps the toner image on transfer paper pressed by the glosser 80 and fixes it to the transfer paper at lower-temperature heating or lower pressure than usual in the fixing machine.

Here, image data (or document data) input from the host device 10 will be explained. In the host device 10, image data is generated by an image processing application installed in advance (such as an image processing unit 120, a plane data generation unit 122 and a print data generation unit 123 which will be described later) and transmitted to the DFE 50. In such an image processing application, it is possible to cope with image data of special color plane for image data in which the value of the density (hereinafter referred to as "density value") of each color in each color plane such as an RGB plane and CMYK planes, is defined every pixel. The special color plane denotes image data to attach special toners or inks such as white, gold and silver in addition to basic colors such as CMYK and RGB, and denotes data for a printer mounting such special toners or inks. In the special color plane, to improve the color reproducibility, "R" may be added to the basic colors of CMYK or "Y" may be added to the basic colors of RGB. Normally, the clear toner is treated as one of special colors.

In the present embodiment, this clear toner as a special color is used to form a surface effect that is a visual or haptical effect assigned to a transfer paper or form a transparent image such as a watermark and texture other than the above surface effect on a transfer paper.

Therefore, with respect to input image data, in response to a user's instruction, the image processing application in the host device 10 generates image data of glaze control plane and/or image data of clear plane as image data of special color plane, in addition to image data of color plane.

Here, the image data of color plane denotes image data in which the density values of colors such as RGB and CMYK are defined every pixel. In this image data of color plane, one pixel is represented by 8 bits by user's color designation. FIG. 2 is an explanatory diagram illustrating an example of image data of color plane. In FIG. 2, the density value corresponding to a color designated by the user in the image processing application is assigned every drawing object such as "A," "B" and "C."

Also, the image data of glaze control plane denotes image data in which an area with a surface effect and a type of the surface effect are specified, to perform control of attaching a clear toner based on the surface effect that is a visual or haptical effect assigned to a transfer paper.

Similar to the RGB plane and the CMYK planes, this glaze control plane is represented by 8-bit density values from "0" to "255" every pixel, and these density values are associated with the types of surface effects (the density values may be represented by 16 bits, 32 bits or 0 to 100%). Also, the same value is set in a range to which the same surface effect is assigned, regardless of actually attached clear toner density, and therefore it is possible to easily specify an area from image data if necessary, without data indicating the area. That is, by the glaze control plane, the surface effect type and the area to which the surface effect is assigned, are represented (data indicating the area may be separately assigned).

Here, the host device 10 sets a surface effect type with respect to a drawing object designated by the user in the image processing application, as a density value that is a glaze control value every drawing object, and generates image data of glaze control plane in a vector format (i.e. glaze control plane data).

Each pixel forming this image data of glaze control plane corresponds to each pixel of the image data of color plane. Also, in each image data, the density value represented by each pixel is a pixel value. Also, the image data of color plane and the glaze control plane are both formed in a page unit.

Surface effect types are roughly classified into, for example, a type related to existence/non-existence of glaze, surface protection, watermark with built-in information and texture. As illustrated in FIG. 3, there are roughly four kinds of surface effects related to existence/non-existence of glaze, including PG (Premium Gloss), G (Gloss), M (Matt) and PM (Premium Matt) in order of glaze degree (i.e. glossiness). In the following, the premium gloss, the gloss, the matt and the premium matt may be referred to as "PG," "G," "M" and "PM," respectively.

In the premium gloss and the gloss, the degree of given glaze is high, and, by contrast, in the matt and the premium matt, glaze is suppressed. Especially, the premium matt realizes lower glossiness than glossiness in a normal transfer paper. In the figure, the premium gloss shows that its glossiness is 80 or more, the gloss shows primary-color or secondary-color gloss, the matt shows primary-color gloss with 30% halftone, and the premium gloss shows that its glossiness is 10 or less. Also, the deviation of glossiness is expressed as ΔGs and set to 10 or less. For such surface effect types, a surface effect to give high glossiness is associated with a high density value, and a surface effect to suppress glaze is associated with low density value. The medium density value is associated with a surface effect such as watermark and texture. As the watermark, for example, a character or woven pattern is used. The texture indicates a character or design, and can give a haptical effect in addition to a visual effect. For example, it is possible to realize a stained glass by a clear toner. The premium gloss or the gloss is used as a substitute for the surface protection. Also, regarding information as to which area of an image represented by image data of the processing target a surface effect is assigned and what kind of surface effect is assigned to the area, it is designated by the user via an image processing application. In the host device 10 that executes the image processing application, a density value associated with a surface effect designated by the user is set to a drawing object forming an area designated by the user, such that image data of glaze control plane is generated. Correspondence relationships between density values and surface effect types will be described later.

FIG. 4 is an explanatory diagram illustrating an example of image data of glaze control plane. The example of the glaze control plane in FIG. 4 illustrates that the user assigns the surface effect "PG (Premium Gloss)" to drawing objects "ABC," the surface effect "G (Gloss)" to a drawing object "rectangle graphic" and the surface effect "M (Matt)" to a drawing object "circular graphic." Also, the density value set to each surface effect denotes a density value defined based on the surface effect type in a density value selection table (described later) (see FIG. 9).

Figure 5:
FIG. 5 is a view illustrating an example of image data of clear plane.

Image data of clear plane denotes image data specifying a transparent image such as a watermark and texture other than the above surface effects. FIG. 5 is an explanatory diagram illustrating an example of the image data of clear plane. In the example of FIG. 5, a watermark "Sale" is designated by the user.

Thus, image data of gloss control plane and clear plane, which is image data of special color plane, is generated in a different plane from image data of color plane by an image processing application of the host device 10. Also, although image data formats of the image data of color plane, image data of glaze control plane and image data of clear plane adopt a PDF (Portable Document Format) format, the PDF image data of these planes is integrated to generate document data. Also, the data format of each block image data is not limited to PDF but may adopt an arbitrary format.

Figure 6:
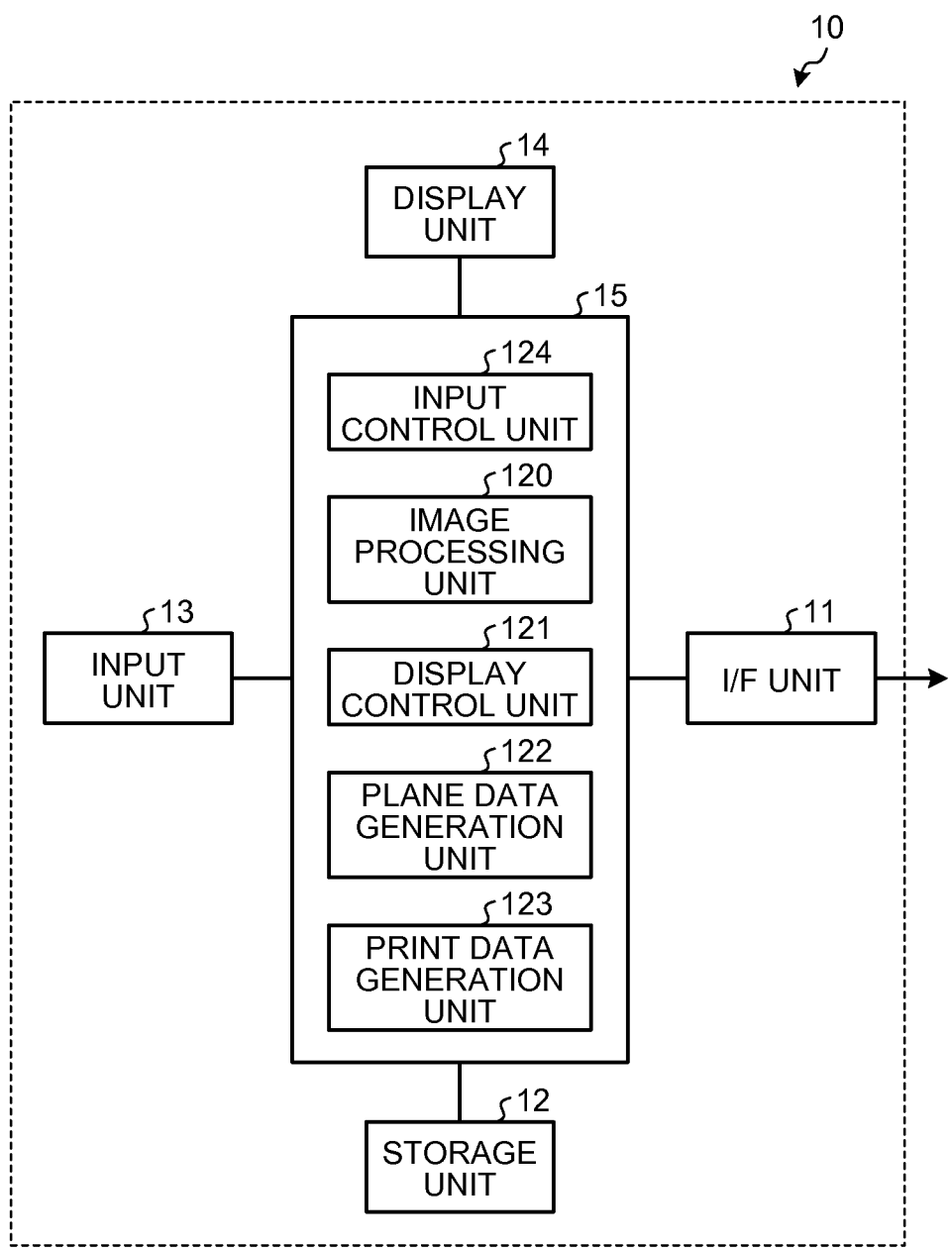
FIG. 6 is a block diagram illustrating a schematic configuration example of a host device.

Next, the host device 10 that generates such block image data will be explained in detail. FIG. 6 is a block diagram illustrating a schematic configuration example of the host device 10. As illustrated in FIG. 6, the host device 10 is configured to include an I/F unit 11, a storage unit 12, an input unit 13, a display unit 14 and a control unit 15. The I/F unit 11 is an interface device to perform communication with the DFE 50. The storage unit 12 is a storage medium such as a hard disk drive (HDD) and memory to store various kinds of data. The input unit 13 is an input device to perform various manipulated inputs by the user, and is configured with, for example, a keyboard and mouse. The display unit 14 is a display device to display various screens, and is configured with, for example, a liquid crystal panel.

The control unit 15 controls the entire of the host device 10 and is configured to include a CPU, ROM and RAM. As illustrated in FIG. 6, the control unit 15 mainly includes an input control unit 124, an image processing unit 120, a display control unit 121, a plane data generation unit 122 and a print data generation unit 123. Among these units, the input control unit 124 and the display control unit 121 are realized by reading an operating system program stored in the ROM or the like and developing it on the RAM by the CPU of the control unit 15. The image processing unit 120, the plane data generation unit 122 and the print data generation unit 123 are realized by reading the above image processing application program stored in the ROM or the like and developing it on the RAM by the CPU of the control unit 15. Here, the plane data generation unit 122 is provided as a function of a plugin installed in the image processing application. Also, at least one of these units can be realized by individual circuits (i.e. hardware).

The input control unit 124 accepts various inputs from the input unit 13 and controls these inputs. For example, by operating the input unit 13, the user can input image designation information to designate an image to which a surface effect is assigned, that is, image data of color plane (which may be referred to as "target image" below), among various images (e.g. a photograph, a character, a graphic or an image combining these) stored in the storage unit 12. Also, an input method of image designation information is not limited to this but is arbitrary.

The display control unit 121 controls the display of various kinds of information for the display unit 14. According to the present embodiment, in a case where the input control unit 124 accepts image designation information, the display control unit 121 controls the display unit 14 to read an image designated by the image designation information from the storage unit 12 and display the read image on a display.

By operating the input unit 13 while checking the target image displayed in the display unit 14, the user can input designation information to designate an area to which a surface effect is assigned and a type of the surface effect. Also, an input method of the designation information is not limited to this but is arbitrary.

Figure 7:
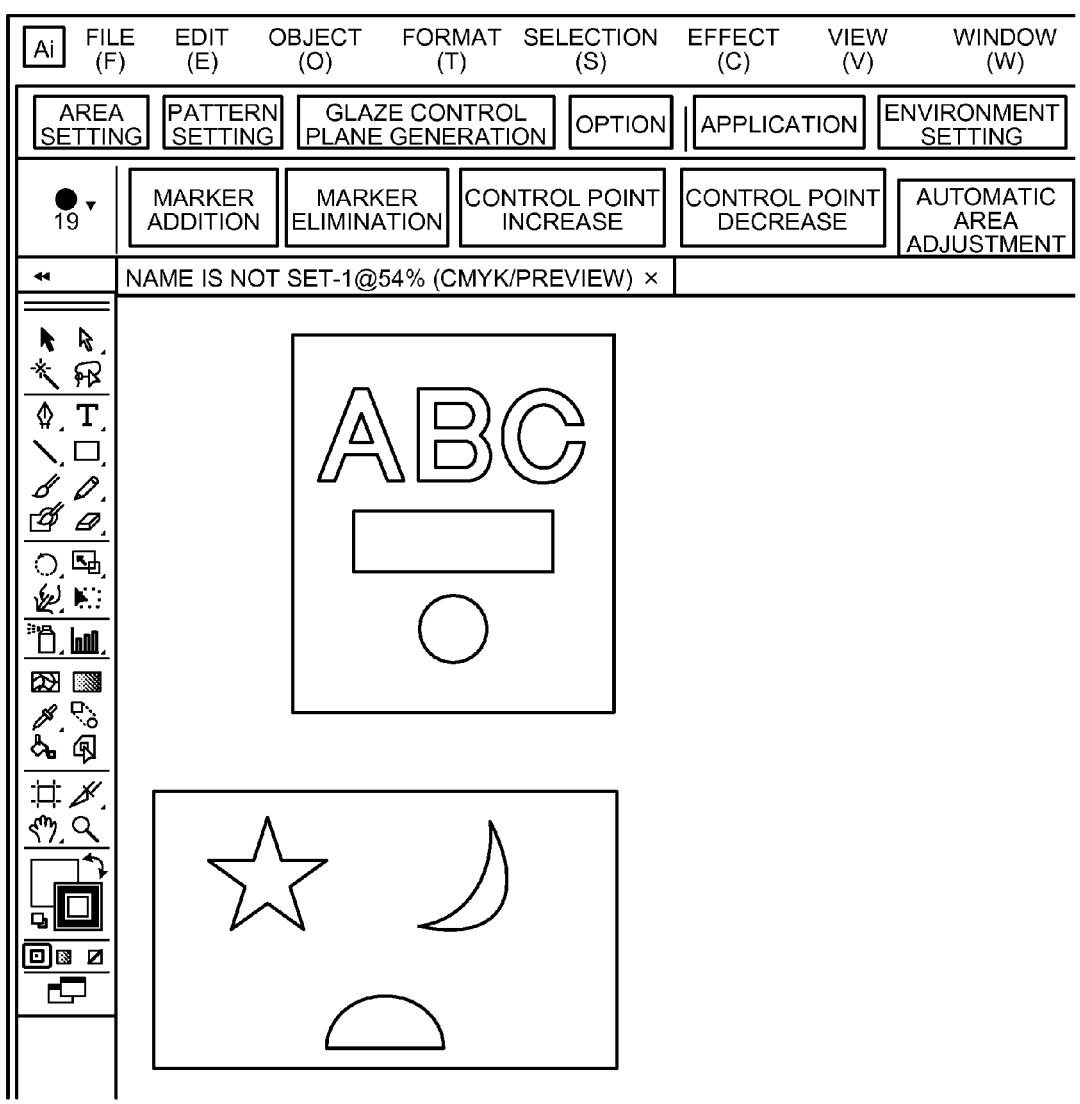
FIG. 7 is a view illustrating a screen example displayed by an image processing application.
Figure 8:
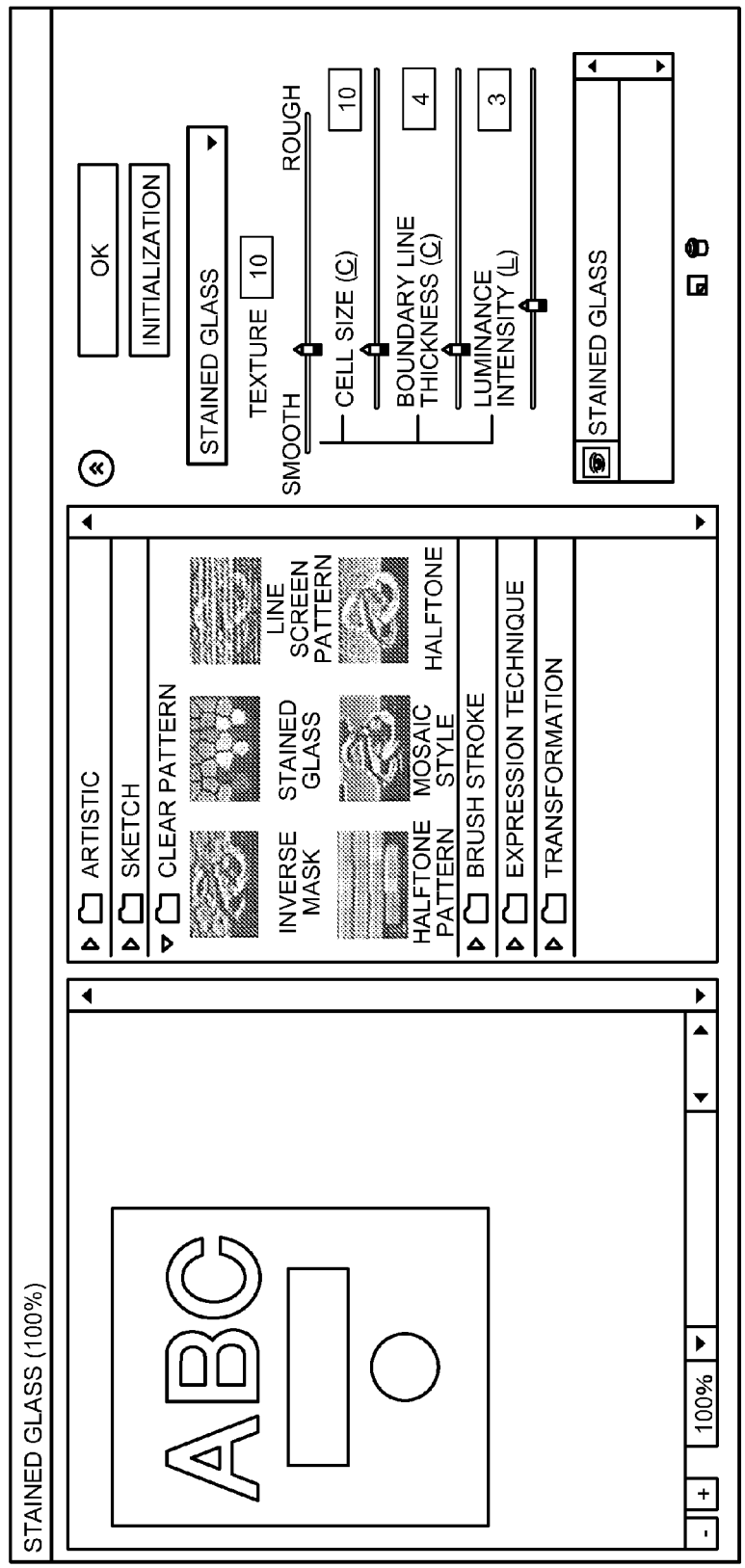
FIG. 8 is a view illustrating a screen example displayed by an image processing application.

To be more specific, the display control unit 121 causes the display unit 14 to display the screen exemplified in FIG. 7, for example. This FIG. 7 an example of a screen displayed in a case where a plugin is installed in Illustrator sold by Adobe Systems Incorporated. In the screen illustrated in FIG. 7, an image represented by target image data (i.e. image data of color plane) of a processing target is displayed, and, by pressing an marker addition button via the input unit 13 and performing a manipulated input to designate an area to which a surface effect is assigned, the user designates the area to which the surface effect is assigned. The user performs such a manipulated input on all areas to which a surface effect is assigned. Subsequently, the display control unit 121 of the host device 10 causes the display unit 14 to display a screen exemplified in FIG. 8 every designated area, for example. In the screen illustrated in FIG. 8, the area image is displayed in each area designated as an area to which a surface effect is assigned, and, by performing a manipulated input via the input unit 13 to designate a type of the surface effect assigned to the image, the type of the surface effect assigned to the area is designated. As a surface effect type, the premium gloss and the gloss in FIG. 3 are expressed as "inverse mask," the other effects than the premium gloss and the gloss in FIG. 3 are expressed as a stained glass, line screen pattern, halftone pattern, mosaic style, halftone dot matt or halftone, which illustrates that various surface effects can be designated.

Returning to FIG. 6, the image processing unit 120 performs various kinds of image processing on a target image according to an instruction from the user via the input unit 13.

The plane data generation unit 122 generates image data of color plane, image data of glaze control plane and image data of clear plane. That is, in a case where the input control unit 124 accepts color designation with respect to a drawing object of a target image by the user, the plane data generation unit 122 generates the image data of color plane according to the color designation.

Also, in a case where the input control unit 124 accepts designation of a transparent image such as a watermark and texture other than the surface effects and designation of an area to which the transparent image is assigned, the plane data generation unit 122 generates clear plane data to specify the transparent image and the area in a transfer paper to which the transparent image is assigned, according to the designation from the user.

Also, in a case where the input control unit 124 accepts designation information (i.e. an area to which a surface effect is assigned and a type of the surface effect), the plane data generation unit 122 generates image data of glaze control plane in which it is possible to specify the area with the surface effect in a transfer paper and the type of the surface effect, based on the designation information. Here, the plane data generation unit 122 generates image data of glaze control plane in which an area with a surface effect indicated by a glaze control value is designated in a drawing object unit of image data of target image.

Figures 9, 10:
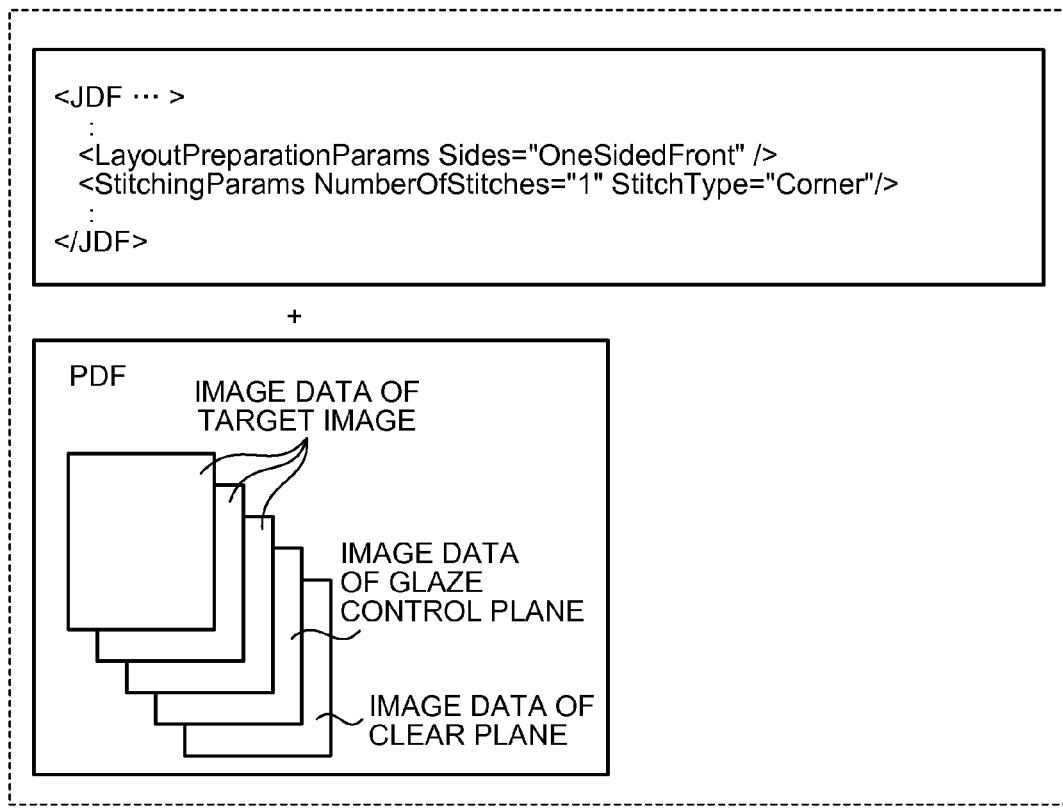
FIG. 9 is a view illustrating an example of a density value selection table.
FIG. 10 is a pattern diagram conceptually illustrating a configuration example of print data.

Here, the storage unit 12 stores a density value selection table storing surface effect types designated by the user and density values of glaze control planes corresponding to the surface effect types. FIG. 9 is a view illustrating an example of the density value selection table. In the example of FIG. 9, the density value of a glaze control plane corresponding to an area to which "PG" (Premium Gloss) is designated by the user is "98%," the density value of a glaze control plane corresponding to an area to which "G" (Gloss) is designated by the user is "90%," the density value of a glaze control plane corresponding to an area to which "M" (Matt) is designated by the user is "16%" and the density value of a glaze control plane corresponding to an area to which "PM" (Premium Matt) is designated by the user is "6%."

This density value selection table is partial data of a surface effect selection table (which will be described later) stored in the DFE 50, and the control unit 15 acquires the surface effect selection table at a predetermined timing, generates the density value selection table from the acquired surface effect selection table and stores it in the storage unit 12. Also, a configuration is possible in which the surface effect selection table is stored in a storage server (cloud) on a network such as the Internet and the control unit 15 acquires the surface effect selection table from the server and performs the generation using the acquired surface effect selection table. Here, the surface effect selection table stored in the DFE 50 and the surface effect selection table stored in the storage unit 12 need to be the identical data.

Returning to FIG. 6, by setting the density value of a drawing object having a predetermined surface effect designated by the user to a value based on a type of the surface effect with reference to the density value selection table illustrated in FIG. 9, the plane data generation unit 122 generates image data of glaze control plane. For example, a case is assumed where the user designates that, among target images as the image data of color plane illustrated in FIG. 2, "PG" is given to the area displayed as "ABC," "G" is given to the rectangular area and "M" is given to the circular area. In this case, by setting the density value of the drawing object ("ABC") of "PG" designated by the user to "98%," the density value of the drawing object ("rectangle") of "G" designated by the user to "90%" and the density value of the drawing object ("circularity") of "M" designated by the user to "16%," the plane data generation unit 122 generates the image data of glaze control plane. The image data of glaze control plane generated in the plane data generation unit 122 denotes vector-format data expressed as aggregation of drawing objects, which indicate point coordinates, equation parameters of lines or sides connecting these lines and fill or special effects. FIG. 4 is a view illustrating this image data of glaze control plane as an image. In the present embodiment, although the PDF format is used as a format of the image data of glaze control plane generated in the plane data generation unit 122, the format of the image data of glaze control plane is not limited to this but is arbitrary. The plane data generation unit 122 generates and outputs, to the print data generation unit 123, document data integrating the image data of glaze control plane, the image data of target image (i.e. image data of color plane) and the image data of clear plane.

The print data generation unit 123 generates print data based on the document data. The print data is configured including the image data of target image (i.e. image data of color plane), the image data of glaze control plane, the image data of clear plane and a job command that designates, for example, the printer setting, aggregation setting and screen setting to a printer. FIG. 10 is a pattern diagram conceptually illustrating a configuration example of print data. In the example of FIG. 10, a JDF (Job Definition Format) is used as a job command, but it is not limited to this. The JDF illustrated in FIG. 10 is a command to designate "one-side printing with staple existence." Also, the print data may be converted into a page description language (PDL) such as PostScript, or may remain in the PDF format if the DFE 50 can support it.

Figure 11:
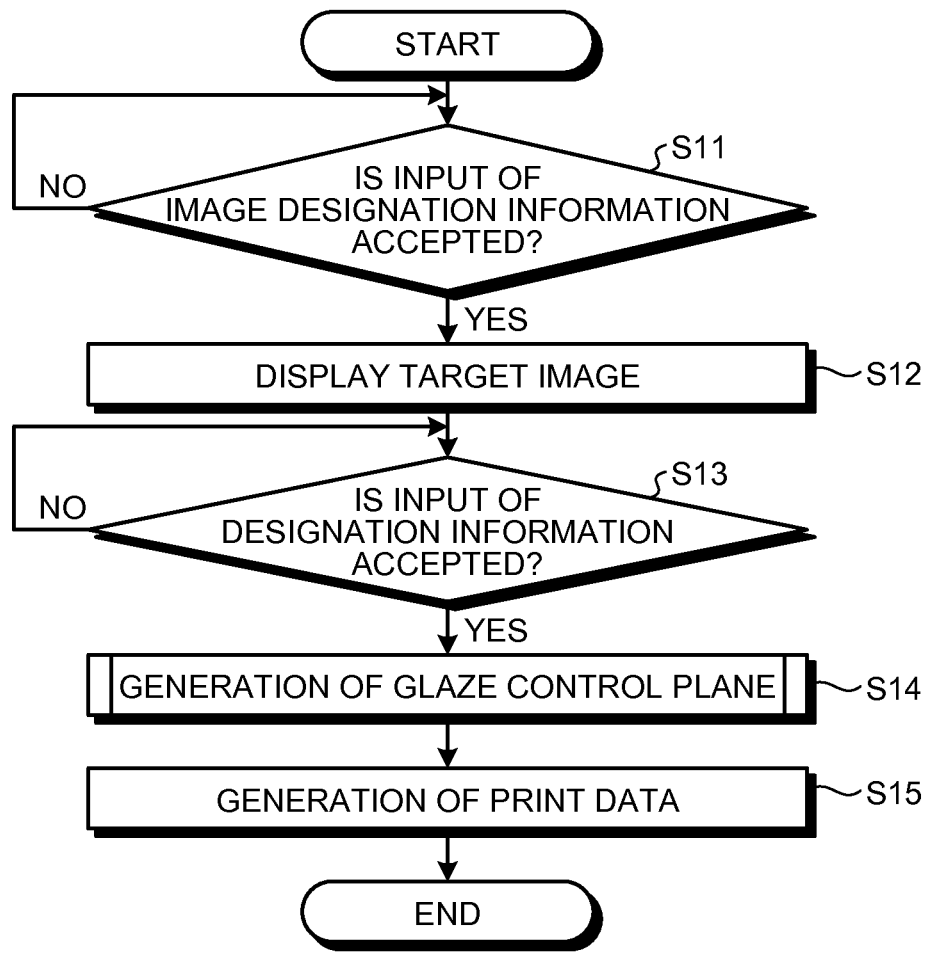
FIG. 11 is a flowchart illustrating steps of print data generation processing in a host device.

Next, generation processing of print data by the host device 10 configured as above will be explained. FIG. 11 is a flowchart illustrating steps of the generation processing of print data by the host device 10 according to the first embodiment. Also, in the processing example shown below, an example case will be explained where a transparent image is not designated and therefore image data of clear plane is not generated.

First, in a case where the input control unit 124 accepts an input of image designation information (step S11: YES), the display control unit 121 controls the display unit 14 to display an image designated by the accepted image designation information (step S12). Next, in a case where the input control unit 124 accepts an input of designation information of a surface effect (step S13: YES), the plane data generation unit 122 generated image data of glaze control plane based on the accepted designation information (step S14).

Figures 12, 13:
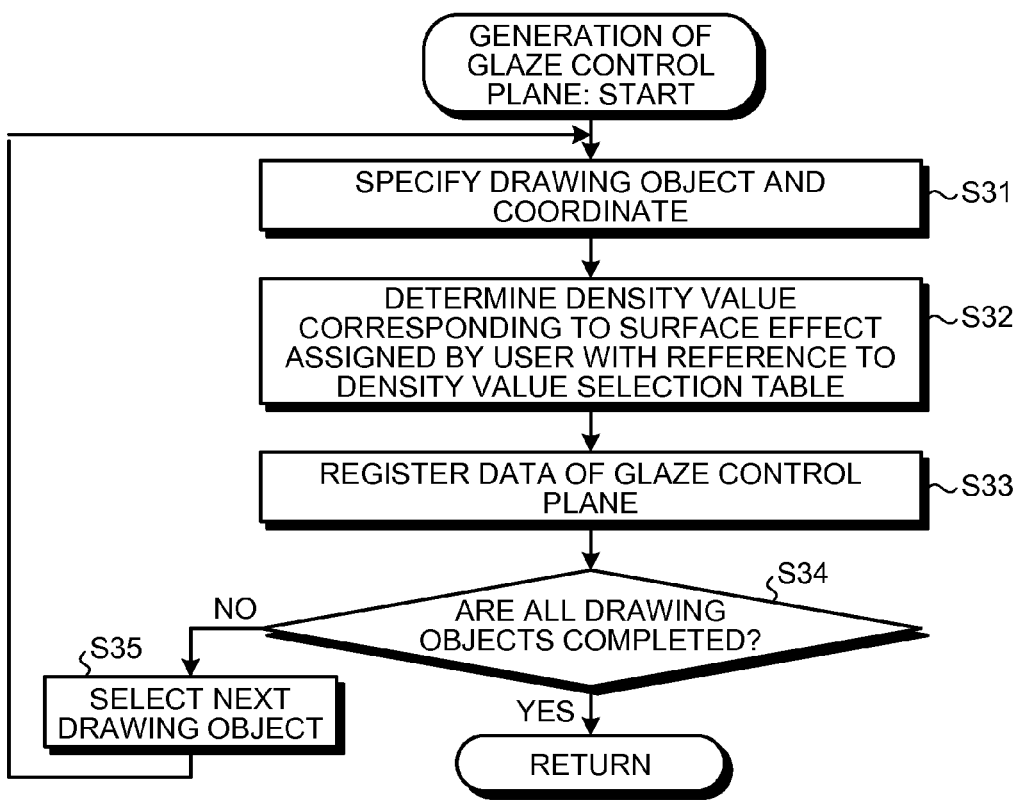
FIG. 12 is a flowchart illustrating steps of generation processing of a glaze control plane.
FIG. 13 is a view illustrating correspondence relationships between drawing objects, coordinates and density values in the image data of glaze control plane in FIG. 4.

Here, the generation processing of the glaze control plane in step S14 will be explained in detail. FIG. 12 is a flowchart illustrating steps of the generation processing of the glaze control plane. First, the plane data generation unit 122 specifies a drawing object in which a surface effect is assigned to a target image by designation information, and its coordinate (step S31). The specification of the drawing object and its coordinate is performed using, for example, a drawing command and a coordinate value set in the drawing command, where the drawing command is provided by, for example, an operating system at the time the image processing unit 120 draws the drawing object on the target image.

Next, the plane data generation unit 122 determines a density value as a glaze control value corresponding to the surface effect assigned by the user in the designation information, with reference to the density value selection table stored in the storage unit 12 (step S32).

Subsequently, the plane data generation unit 122 associates and registers the drawing object and the density value determined based on the surface effect, in image data of glaze control plane (which is empty at the beginning) (step S33).

Next, the plane data generation unit 122 decides whether the processing in above steps S31 to S33 is completed with respect to all drawing objects existing in the object image (step S34). Subsequently, if it is not completed (step S34: No), the plane data generation unit 122 selects the next drawing object that is not processed in the target image (step S35) and repeats the processing in steps S31 to S33.

Subsequently, in step S34, when it is decided that the processing in above steps S31 to S33 is completed with respect to the all drawing objects existing in the object image (step S34: Yes), the plane data generation unit 122 completes the generation of glaze control plane. By this means, the image data of glaze control plane illustrated in FIG. 4 is generated. FIG. 13 is a view illustrating correspondence relationships between drawing objects, coordinates and density values in the image data of glaze control plane in FIG. 4.

Returning to FIG. 11, when the image data of glaze control plane is generated, the plane data generation unit 122 generates document data integrating the image data of glaze control plane and the image data of target image, and outputs it to the print data generation unit 123. Subsequently, the print data generation unit 123 generates print data based on the document data (step S15). The print data is generated in the above way.

Figure 14:
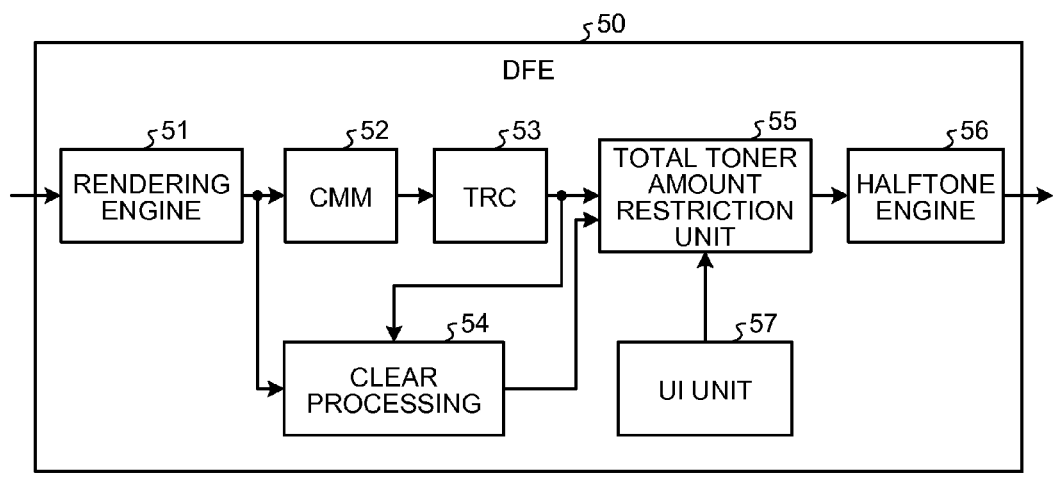
FIG. 14 is a block diagram illustrating a functional configuration example of a DFE.

Next, a functional configuration of the DFE 50 will be explained. The DFE 50 includes a control unit such as a CPU to control the whole device, a main storage unit such as ROM and RAM to store various kinds of data and programs, and a supplementary storage unit such as an HDD to store various kinds of data and programs, and employs a hardware configuration utilizing a normal computer. As a functional configuration, as illustrated in FIG. 14, the DFE 50 includes a rendering engine 51, a CMM (Color Management Module) 52, a TRC (Tone Reproduction Curve) 53, a clear processing 54, a total toner amount restriction unit 55, a halftone engine 56, an UI unit 57 and a surface effect selection table (not illustrated). The rendering engine 51, the CMM 52, the TRC 53, the clear processing 54, the total toner amount restriction unit 55, the halftone engine 56 and the UI unit 57 are realized by executing the various programs stored in the main storage unit and the supplementary storage unit by the DFE 50. The surface effect selection table is stored in, for example, the supplementary storage unit.

In the rendering engine 51, image data (e.g. the print data illustrated in FIG. 10) transmitted from the host device 10 is input. The rendering engine 51 linguistically interprets the input image data, converts the image data expressed in the vector format into a raster format and generates, for example, 8-bit image data of RGB color planes expressed in an RGB color space and 8-bit glaze control plane. The image data of RGB color planes is supplied to CMM 52 and the 8-bit glaze control plane is supplied to the clear processing 54. Also, the rendering engine 51 outputs, to the total toner amount restriction unit 55, object information to specify an object indicating an area in which a predetermined kind of image (such as a character, line, graphic and natural image) in the image data is drawn. The object information is information by which it is possible to specify the type and position of the object.

The CMM 52 converts the color space expressed in the RGB format into the color space in the CMYK format and outputs 8-bit image data of CMYK to the TRC 53. The TRC 53 performs calibration on the CMYK image data input from the CMM 52. Subsequently, gamma correction by a gamma curve of 1D_LUT generated by the calibration is performed and the image data subjected to gamma correction is output to the clear processing 54 and the total toner amount restriction unit 55. The image data of CMYK planes is represented by a density value within a range of 8 bits ("0" to "255") every pixel and configured in page units.

The clear processing 54 uses the input glaze control plane and decides a surface effect with respect to the density value (i.e. pixel value) of each pixel forming the glaze control plane, and, based on the decision, by determining ON/OFF of the glosser 80 and adequately generating an inverse mask or mask using the input 8-bit image data of CMYK, adequately generates image data of clear toner plane (i.e. image data of Clr plane) to attach a clear toner. Subsequently, based on the decision result of the surface effect, the clear processing 54 adequately generates image data of clear toner plane used in the printer machine 70 and image data of clear toner used in the low-temperature fixing machine 90, outputs these and outputs On-Off information indicating ON or OFF to the glosser 80.

Here, the inverse mask is used to equalize the total attachment amount combining the CMYK toners and clear toner on each pixel forming a target area to which a surface effect is assigned. To be more specific, the inverse mask is image data acquired by adding all density values of pixels forming the target area in the image data of CMYK planes and subtracting a predetermined value from the addition value. For example, the above inverse mask 1 is expressed by following Equation (1).

$$Clr=100-(C+M+Y+K) \text{(in the case of } Clr<0, Clr=0) \quad (1)$$

In Equation (1), Clr, C, M, Y and K represent density rates with respect to the clear toner and the toners of C, M, Y and K, which are converted from the density values of each pixel. That is, in Equation (1), the total attachment amount adding the attachment amount of the clear toner to the total attachment amount of the toners of C, M, Y and K, is set to 100% for all pixels forming the target area to which a surface effect is assigned. Also, in a case where the total attachment amount of the toners of C, M, Y and K is equal to or greater than 100%, the clear toner is not attached and its density rate is set to 0%. This is because a portion in which the total attachment amount of the toners of C, M, Y and K is equal to or greater than 100%, is smoothed by the fixing processing. Thus, by setting the total attachment amount to 100% on all pixels forming the target area to which a surface effect is assigned, there is no uneven surface due to a difference between the total toner attachment amounts in the target area, and, as a result, glaze by optical regular reflection is caused. Here, there is an inverse mask acquired in other ways than Equation (1), and there can be a plurality of inverse mask types.

For example, the inverse mask may be acquired by uniformly attaching the clear toner to each pixel. The inverse mask in this case may be referred to as "mask" and expressed by following Equation (2).

$$Clr=100 \quad (2)$$

Also, a pixel of a target to which a surface effect is assigned may be associated with a density rate different from 100%, and there can be several mask patterns.

Also, for example, an inverse mask may be calculated by multiplying ground surface exposure rates of the colors. The inverse mask in this case may be expressed by, for example, following Equation (3).

$$Clr=100 \times \{(100-C)/100\} \times \{(100-M)/100\} \times \{(100-Y)/100\} \times \{(100-K)/100\} \quad (3)$$

In Equation (3), (100−C)/100 represents the ground surface exposure rate of C, (100−M)/100 represents the ground surface exposure rate of M, (100−Y)/100 represents the ground surface exposure rate of Y and (100−K)/100 represents the ground surface exposure rate of K.

Also, for example, the inverse mask may be calculated by a method in which it is assumed that the halftone of the maximum area rate restricts the smoothness. In this case, the inverse mask is expressed by, for example, following Equation (4).

$$Clr=100-\max(C,M,Y,K) \quad (4)$$

In Equation (4), max(C, M, Y, K) shows that the density value of a color having the maximum density value among CMYK is a representative value.

In short, the inverse mask may be expressed by one of above Equations (1) to (4).

The surface effect selection table denotes a table which shows correspondence relationships between density values as glaze control values indicating surface effects and types of the surface effects, and which shows correspondence relationships between these, control information related to a post-processor based on a structure of the image forming system, the image data of clear toner plane used in the printer machine 70 and the image data of clear toner plane used in the post-processor. Although various structures of the image forming system are possible, the present embodiment employs a structure in which the glosser 80 and the low-temperature fixing machine 90 are connected to the printer machine 70 as a post-processor. Therefore, the control information related to the post-processor based on the structure of the image forming system denotes On-Off information indicating ON/OFF of the glosser 80. Also, as the image data of clear toner plane used in the post-processor, there is the image data of clear toner plane used in the low-temperature fixing machine 90. FIG. 15 is a view exemplifying a data structure of the surface effect selection table. Here, the surface effect selection table can be configured so as to illustrate correspondence relationships for respective image forming system structures between control information related to a post-processor, image data of a clear toner plane 1 used in the printer machine 70, image data of a clear toner plane 2 used in the post processor, density values and surface effect types. However, FIG. 15 exemplifies a data structure based on a structure of the image forming system according to the present embodiment. In the correspondence relationships between the surface effect types and the density values illustrated in the figure, each surface effect type is associated every density value range. Also, the density ratio (i.e. density rate) converted from a value representative in the density value range (i.e. representative value) is associated with each surface effect type in units of 2%. To be more specific, surface effects to give glaze (i.e. the premium gloss and the gloss) are associated with a density value range ("212" to "255") in which the density rate is equal to or greater than 84%, and surface effects to suppress glaze (i.e. the matt and the premium matt) are associated with a density value range ("1" to "43") in which the density rate is equal to or less than 16%. Also, in a density value range in which the density rate is between 20% and 80%, surface effects such as a texture and woven watermark are associated.

To be more specific, for example, PM (Premium Gloss) is associated with pixel values "238" to "255" as a surface effect, and, among these, different types of premium glosses are associated with three ranges of pixel values "238" to "242," pixel values "243" to "247" and pixel values "248" to "255." Also, G (Gloss) is associated with pixel values "212" to "232" as a surface effect, and, among these, different types of glosses are associated with four ranges of pixel values "212" to "216," pixel values "217" to "221," pixel values "222" to "227" and pixel values "228" to "232." Also, M (Matt) is associated with pixel values "23" to "43" as a surface effect, and, among these, different types of matts are associated with four ranges of pixel values "23" to "28," pixel values "29" to "33," pixel values "34" to "38" and pixel values "39" to "43." Also, PM (Premium Matt) is associated with pixel values "1" to "17" as a surface effect, and, among these, different types of premium matts are associated with three ranges of pixel values "1" to "7," pixel values "8" to "12" and pixel values "13" to "17." These different types of the identical surface effect are different in equations to calculate image data of clear toner plane used in the printer machine or the low-temperature fixing machine, and operations of the printer itself and the post-processor are identical. Also, no surface effect is associated with a density value of "0."

Also, in FIG. 15, with respect to the pixel values and surface effects, content of On-Off information indicating ON/OFF of the glosser 80, content of the image data of the clear toner plane 1 ("Clr-1" in FIG. 1) used in the printer machine 70 and content of the image data of the clear toner plane 2 used in the low-temperature fixing machine 90 are illustrated. For example, in a case where the surface effect is the premium gloss, it is illustrated that the glosser 80 is turned on, the image data of the clear toner plane 1 used in the printer machine 70 indicates an inverse mask and the image data of the clear toner plane 2 ("Clr-2" in FIG. 1) used in the low-temperature fixing machine 90 is not provided. The inverse mask is calculated by, for example, above Equation (1). Also, the example illustrated in FIG. 15 is an example case where an area in which the premium gloss is designated as a surface effect corresponds to the whole area defined by image data. An example case will be described later where the area in which the premium gloss is designated as a surface effect corresponds to part of the area defined by the image data.

Also, in a case where the density values are "228" to "232" and the surface effect is the premium gloss, it is illustrated that the glosser 80 is turned off, the image data of the clear toner plane 1 used in the printer machine 70 is an inverse mask 1 and the image data of the clear toner 2 used in the low-temperature fixing machine 90 is not provided. Also, the inverse mask 1 may be expressed by one of above Equations (1) to (4). This is because, since the glosser 80 is turned off and the smoothed total toner attachment amount varies, the surface asperity increases by the premium gloss and, as a result, the gloss of lower glossiness than the premium gloss is acquired. Also, in a case where the surface effect is the matt, it is illustrated that the glosser 80 is turned off, the image data of the clear toner 1 used in the printer machine 70 is a halftone (matt) and the image data of the clear toner 2 used in the low-temperature fixing machine 90 is not provided. Also, in a case where the surface effect is the premium matt, it is illustrated that the glosser 80 is turned on or off, the image data of the clear toner 1 used in the printer machine 70 is not provided and the image data of the clear toner 2 used in the low-temperature fixing machine 90 is a mask. The mask is calculated by, for example, above Equation (2).

The clear processing 54 decides the surface effect associated with each pixel value illustrated by the glaze control plane with reference to the above surface effect selection table, decides ON/OFF of the glosser 80 and decides what image data of clear toner is used in the printer machine 70 and the low-temperature fixing machine 90. Also, the clear processing 54 makes the decision as to ON/OFF of the glosser 80 every page. Subsequently, as described above, based on the decision result, the clear processing 54 adequately generates image data of clear toner plane and outputs this, and outputs On-Off information with respect to the glosser 80. The image data of clear toner plane is supplied to the total toner amount restriction unit 55.

The total toner amount restriction unit 55 restricts the total toner amount with respect to the input image data of CMYK planes and image data of clear toner plane. Subsequently, the image data of CMYK planes and image data of clear toner plane for which the total toner amount is restricted, are output to the halftone engine 56. The halftone engine 56 performs halftone processing on the image data of CMYK planes and the image data of clear toner plane, which are supplied from the total toner amount restriction unit 55. Each 2-bit image data of CMYK and each 2-bit image data of clear toner plane subjected to halftone processing are integrated, and the integrated image data is output to the printer machine 70 via the MIC 60. Also, a bit number to represent the density value of each pixel of the image data is arbitrary and is not limited to 2 bits. Also, the On-Off information with respect to the glosser 80, which is output by the clear processing 54, is output to the MIC 60.

Further, the DFE 50 according to the present embodiment includes the UI (User Interface) unit 57. The UI unit 57 displays various kinds of information and accepts various kinds of instructions.

Figure 16:
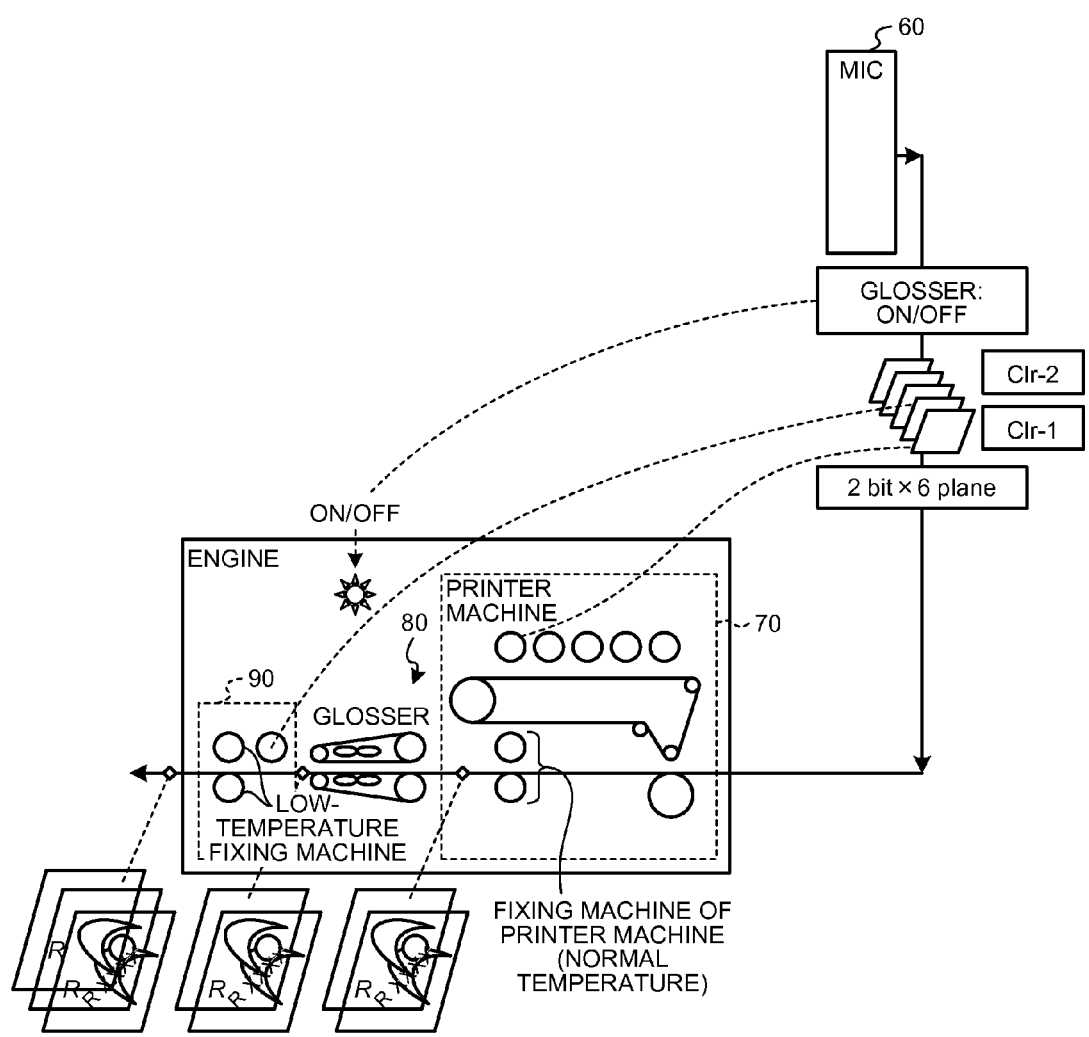
FIG. 16 is a view conceptually exemplifying a configuration of an MIC 60.

As exemplified in FIG. 16, the MIC 60 outputs to the printer machine 70 the image data of CMYK color planes in the image data output from the DFE 50, outputs the image data of clear toner plane used in the printer machine 70 to the printer machine 70 in a case where this image data is present, turns on/off the glosser 80 using the On-Off information output from the DFE 50 and outputs the image data of clear toner plane used in the low-temperature fixing machine 90 to the low-temperature fixing machine 90 in a case where this image data is present. The glosser 80 may switch between a path to perform the fixing and a path to not perform the fixing, by the On-Off information. The low-temperature fixing machine 90 may switch ON/OFF according to an existence/non-existence of the image data of clear toner plane, or may switch the paths similar to those in the glosser 80. Also, as illustrated in FIG. 16, the printing device formed with the printer machine 70, the glosser 80 and the low-temperature fixing machine 90 includes a conveyance path to convey a storage medium. Also, specifically, the printer machine 70 includes a plurality of electrophotography photoreceptor drums, a transfer belt that transfers a toner image formed on the photoreceptor drums, a transfer device that transfers the toner image on the transfer belt to a recording medium, and a fixing machine that fixes the toner image on the storage medium to the storage medium. The storage medium is conveyed in the conveyance path by a conveyance member (not illustrated) so as to be conveyed through the positions of the printer machine 70, the glosser 80 and the low-temperature fixing machine in order. Subsequently, after processing by these machines is performed and image forming and surface effect attachment are performed, it is conveyed in the conveyance path by a conveyance mechanism (not illustrated) and discharged to the outside of the printing device.

Next, specific functions of the total toner amount restriction unit 55 will be explained. The total toner amount restriction unit 55 according to the present embodiment sets, by an instruction from the user, a stored color indicating a color for which the toner amount is not restricted (i.e. color to be stored), every object indicating an area in which a predetermined image type (such as a character, line, graphic and natural image) in image data, and sets density values of colors different from the stored color such that the total sum of the density values of the colors in pixels in each object is within a value subtracting the density value of the stored color from a reference value corresponding to the upper limit value of the total toner amount. This will be explained in detail.

Figures 17, 18:
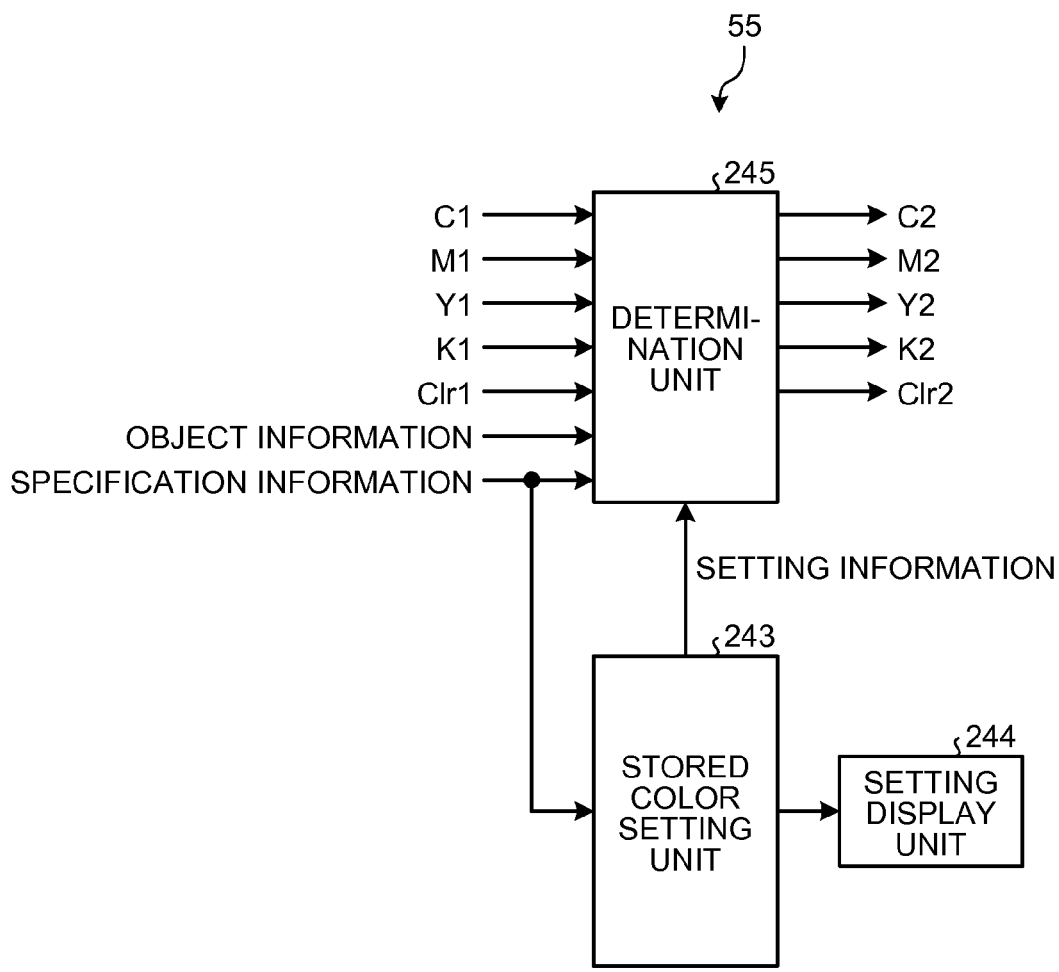
FIG. 17 is a pattern diagram illustrating an example of an input screen.
FIG. 18 is a block diagram illustrating a functional configuration example of a total toner amount restriction unit.

In the present embodiment, as illustrated in FIG. 17, the UI unit 57 displays a screen to move the user to select a stored color. In the example of FIG. 17, the UI unit 57 displays a screen for the user to select one of C, M, Y, K and Clr (clear) as a stored color every object.

Subsequently, by selecting one of buttons (e.g. buttons displayed in the UI unit 57) corresponding to C, N, Y, K and Clr (clear) every object by the user, a signal specifying the stored color of each object (hereinafter referred to as "specification information") is output from the UI unit 57 to the total toner amount restriction unit 55. Also, if any color is not selected in a predetermined object, specification information is output including a signal to indicate that the stored color is not set for the object.

Also, although the present embodiment explains a case where the UI unit 57 is set in the DFE 50, the UI unit 57 may be set in the host device 10. That is, the DFE 50 may accept specification information to specify the stored color every object, from the host device 10.

FIG. 18 is a block diagram illustrating a functional configuration example of the total toner amount restriction unit 55. The total toner amount restriction unit 55 performs restriction processing to restrict the total toner amount used per pixel of image data within a total amount restriction value. Here, as the upper limit value of the total sum of density values of CMYKClr in one pixel, a value (i.e. reference value) corresponding to the total amount restriction value is set in advance. As illustrated in FIG. 18, the total toner amount restriction unit 55 includes a stored color setting unit 243, a setting display unit 244 and a determination unit 245. The stored color setting unit 243 inputs specification information to specify the stored color of each object. In the determination unit 245, image data of CMYK planes, image data of clear toner plane and object information capable of specifying a type or position of an object are input.

The stored color setting unit 243 sets the stored color of each object according to the input specification information. Subsequently, every object, the stored color setting unit 243 outputs setting information to instruct a determination method of the density value of each color in pixels in the object (in other words, restriction processing method), to the determination unit 245.

As an example, a case is assumed where the stored color of an object indicating an area, in image data, in which a character is drawn is K, the stored color of an object indicating an area, in the image data, in which a line is drawn is M, the stored color of an object indicating an area, in the image data, in which a graphic is drawn is not set, and the stored color of an object indicating an area, in the image data, in which a natural image is drawn is Clr. In this case, the stored color setting unit 243 sets K as the stored color of the object indicating the area in which the character is drawn. Subsequently, regarding the object indicating the area in which the character is drawn, setting information to instruct restriction processing to be performed using the following equations, is output to the determination unit 245.

$$C2=C1\times(Limit-K1)/(C1+M1+Y1+Clr1) \quad (5)$$

$$M2=M1\times(Limit-K1)/(C1+M1+Y1+Clr1) \quad (6)$$

$$Y2=Y1\times(Limit-K1)/(C1+M1+Y1+Clr1) \quad (7)$$

$$K2=K1 \quad (8)$$

$$Clr2=Clr1\times(Limit-K1)/(C1+M1+Y1+Clr1) \quad (9)$$

In the above equations, C1, M1, Y1, K1 and Clr1 represent the density values of C, M, Y, K and Clr before restriction processing (i.e. before the determination in the determination unit 245), and C2, M2, Y2, K2 and Clr2 represent the density values of C, M, Y, K and Clr after the restriction processing (i.e. after the determination in the determination unit 245). Also, Limit represents a reference value.

Also, the stored color setting unit 243 sets M as the stored color of the object indicating the area in which the line is drawn. Subsequently, regarding the object indicating the area in which the line is drawn, setting information to instruct restriction processing to be performed using the following equations, is output to the determination unit 245.

$$C2=C1\times(Limit-M1)/(C1+Y1+K1+Clr1) \quad (10)$$

$$M2=M1 \quad (11)$$

$$Y2=Y1\times(Limit-M1)/(C1+Y1+K1+Clr1) \quad (12)$$

$$K2=K1\times(Limit-M1)/(C1+Y1+K1+Clr1) \quad (13)$$

$$Clr2=Clr1\times(Limit-M1)/(C1+Y1+K1+Clr1) \quad (14)$$

Further, the stored color setting unit 243 sets Clr as the stored color of the object indicating the area in which the natural image is drawn. Subsequently, regarding the object indicating the area in which the natural image is drawn, setting information to instruct restriction processing to be performed using the following equations, is output to the determination unit 245.

$$C2=C1\times(Limit-Clr1)/(C1+M1+Y1+K1) \quad (15)$$

$$M2=M1\times(Limit-Clr1)/(C1+M1+Y1+K1) \quad (16)$$

$$Y2=Y1\times(Limit-Clr1)/(C1+M1+Y1+K1) \quad (17)$$

$$K2=K1\times(Limit-Clr1)/(C1+M1+Y1+K1) \quad (18)$$

$$Clr2=Clr1 \quad (19)$$

In the present embodiment, the above equations are stored in a storage unit (not illustrated). Subsequently, it is set that the stored color setting unit 243 reads a corresponding equation based on specification information from the storage unit.

Figures 19, 20:
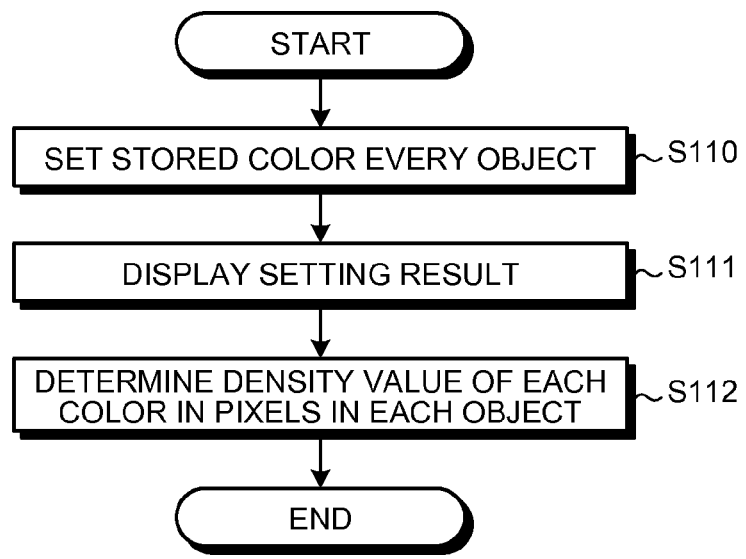
FIG. 19 is a view illustrating a display example of a setting result in a stored color setting unit.
FIG. 20 is a flowchart illustrating an example of restriction processing.

The setting display unit 244 displays the setting results in the stored color setting unit 243. FIG. 19 illustrates a display example of the above setting results. The determination unit 245 determines the density value of each color in pixels included in image data of CMYKClr planes, using the object information and the setting information, every time the image data is obtained in page units. To be more specific, regarding an object for which a stored color is set, the determination unit 245 determines the density value of each color such that the total sum of the density values of colors other than the stored color in pixels in the object is within a value subtracting the density value of the stored color from a reference value. Meanwhile, regarding an object for which a stored color is not set, the density value of each color is determined such that the total sum of the density values of colors in pixels in the object is within a reference value.

Next, the restriction processing performed in the total toner amount restriction unit 55 will be explained with reference to FIG. 20. FIG. 20 is a flowchart illustrating an example of the restriction processing performed in the total toner amount restriction unit 55. It is presumed that the above specification information is input in the stored color setting unit 243 and the image data of CMYKClr planes before the restriction processing and the object information are input in the determination unit 245. As illustrated in FIG. 20, first, the stored color setting unit 243 sets a stored color every object according to the input specification information (step S110). For example, in a case where the above specification information (which specifies K as the stored color of the object indicating the area in which the character is drawn, M as the stored color of the object indicating the area in which the line is drawn, nothing as the stored color of the object indicating the area in which the graphic is drawn, and Clr as the stored color of the object indicating the area in which the natural image is drawn) is input, the stored color setting unit 243 sets K as the stored color of the object indicating the area in which the character is drawn, M as the stored color of the object indicating the area in which the line is drawn, Clr as the stored color of the object indicating the area in which the natural image is drawn, and nothing as the stored color of the object indicating the area in which the graphic is drawn. Subsequently, the stored color setting unit 243 outputs setting information to instruct a determination method of the density value of each color in pixels in the object, to the determination unit 245.

Next, the setting display unit 244 displays the setting results in above step 110 (step S111). Next, every object, the determination unit 245 determines the density value of each color in pixels in the object (step S112). To be more specific, the determination unit 245 determines the density value of each color in the pixels in each object, based on the setting information from the stored color setting unit 243. For example, in a case where the determination unit 245 accepts an input of the setting information to instruct that: restriction processing is performed using above Equations (5) to (9) for the object indicating the area in which the character is drawn; restriction processing is performed using above Equations (10) to (14) for the object indicating the area in which the line is drawn; and restriction processing is performed using above Equations (15) to (19) for the object indicating the area in which the natural image is drawn, the determination unit 245 determines the density value of each color in the pixels in each object based on the setting information. In this case, regarding the object indicating the area in which the graphic is drawn, since a restriction processing method is not instructed, the determination unit 245 determines the density value of each color for the object indicating the area in which the graphic is drawn, such that the total sum of the density values of colors in the pixels in the object is within a reference value (i.e. a specific color is not stored).

As described above, a stored color is set every object according to designation from the user, and, regarding an object in which the stored color is set, the density value of each color is determined such that the total sum of the density values of colors other than the stored color in the pixels in the object is within a value subtracting the density value of the stored color from a reference value. Meanwhile, regarding an object in which a stored color is not set, the density value of each color is determined such that the total sum of the density values of the colors in the pixels in the object is within a reference value. Thus, image data of CMYKClr planes in which the total toner amount is restricted is generated.

As described above, in the present embodiment, a stored color to indicate a color for which the toner amount is not restricted is set every object in response to an instruction from the user, and the total toner amount is restricted. That is, by designating a stored color by the user according to an image type or use application, restriction processing based on the image type or use application is performed, and therefore there is an advantageous effect that it is possible to improve image quality compared to a structure of uniformly performing total toner restriction on each color material regardless of the image type or use application.

Figure 21:
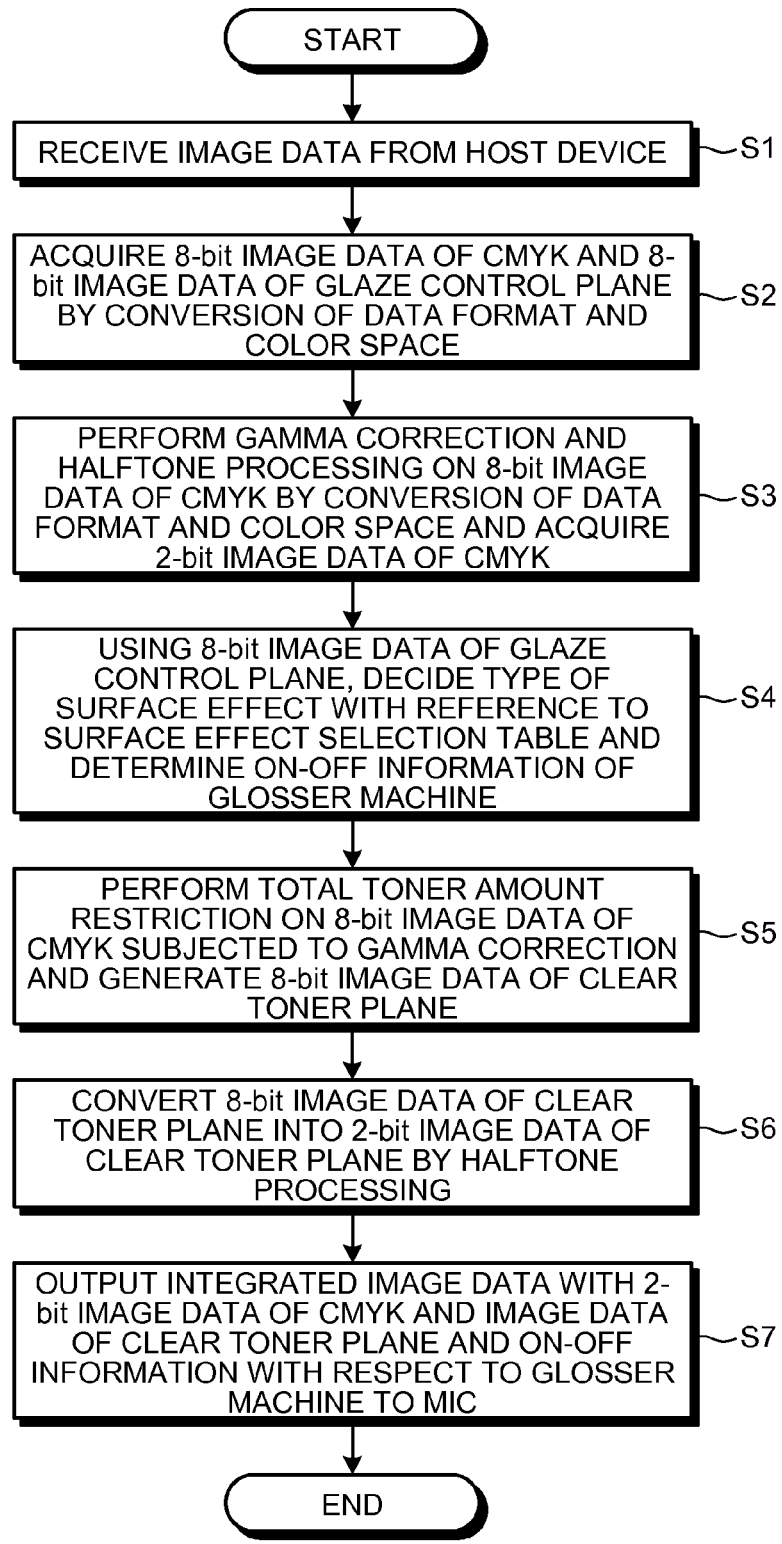
FIG. 21 is a flowchart illustrating steps of glaze control processing performed in an image forming system.

Next, steps of glaze control processing performed in the image forming system according to the present embodiment will be explained using FIG. 21. Also, in the following, an explanation will be given where the above restriction processing is omitted. When the DFE 50 receives image data from the host device 10 (step S1), the rendering engine 51 linguistically interprets this, converts the image data expressed in the vector format into the raster format, converts the color space expressed in the RGB format into the color space in the CMYK format and thereby acquires 8-bit image data of CMYK color planes and 8-bit glaze control plane (step S2).

Figure 22:
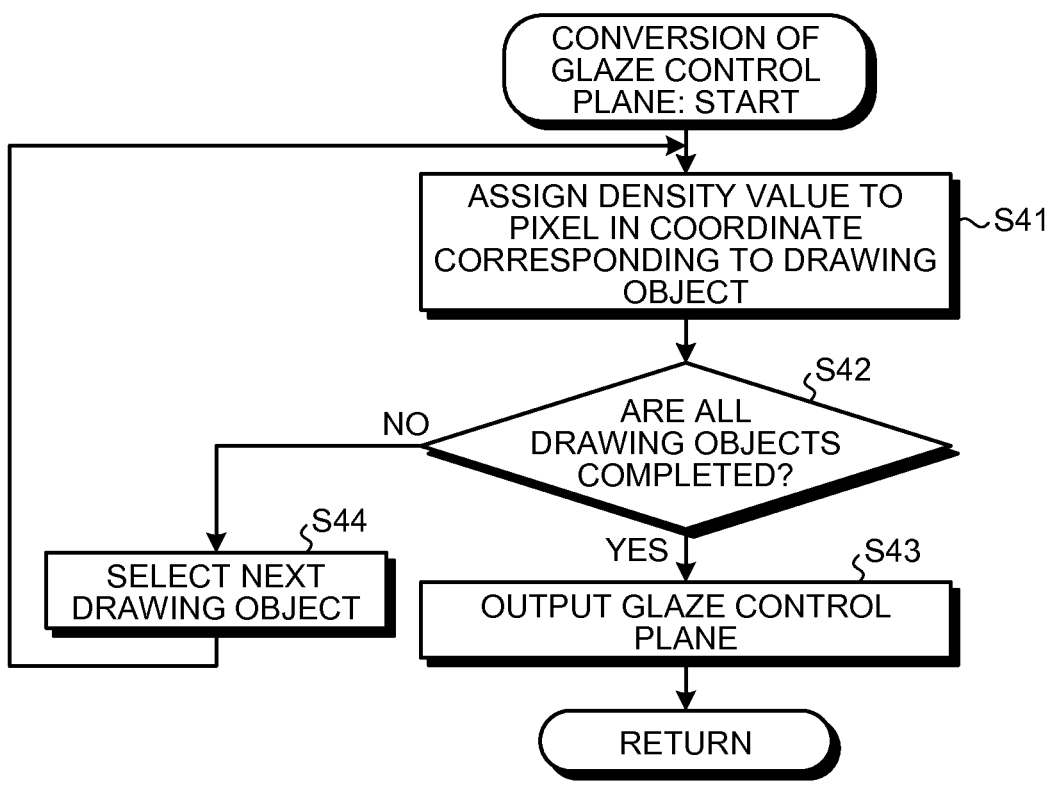
FIG. 22 is a flowchart illustrating steps of image data conversion processing of a glaze control plane.

Here, the conversion processing of the image data of glaze control plane in step 2 will be explained in detail. FIG. 22 is a flowchart illustrating steps of the conversion processing of the image data of glaze control plane. In this conversion processing, the image data of glaze control plane in FIG. 6, that is, as illustrated in FIG. 13, image data of glaze control plane in which a density value to specify a surface effect is designated every drawing object, is converted into image data of glaze control plane in which a density value is designated for each pixel forming a drawing object.

The rendering engine 51 assigns a density value set for a drawing object to pixels in the range of coordinates corresponding to the drawing object of glaze control plane illustrated in FIG. 13 (step S41) and thereby converts the image data of glaze control plane. Subsequently, it is decided whether such processing is completed for all drawing objects existing in the image data of glaze control plane (step S42).

Subsequently, in a case where it is not completed yet (step S42: No), the rendering engine 51 selects the next unprocessed drawing object in the image data of glaze control plane (step S44) and repeats the processing in step S41.

Meanwhile, in step S42, in a case where the processing in step S41 is completed for all the drawing objects in the image data of glaze control plane (step S42: Yes), the converted image data of glaze control plane is output (step S43). By the above processing, the image data of glaze control plane is converted into data in which a surface effect is set every pixel.

Returning to FIG. 21, when the 8-bit image data of glaze control plane is output, the TRC 53 of the DFE 50 performs gamma correction on the 8-bit image data of CMYK color planes by a gamma curve of 1D_LUT generated by calibration (step S3).

Also, using the 8-bit glaze control plane, the clear processing 54 of the DFE 50 decides a surface effect designated with respect to each pixel value shown by the glaze control plane, with reference to the surface effect selection table. Subsequently, the clear processing 54 makes such a decision for all pixels forming the glaze control plane. Also, in the glaze control plane, basically the identical-range density values are set to all pixels forming an area to which each surface effect is assigned. Therefore, regarding a close pixel decided to have the identical surface effect, the clear processing 54 decides that it is included in the area to which the identical surface effect is assigned. Thus, the clear processing 54 decides an area to which a surface effect is assigned and a type of the surface effect assigned to the area. Subsequently, the clear processing 54 determines ON/OFF of the glosser 80 according to the decision (step S4).

Next, the clear processing 54 of the DFE 50 performs total toner amount restriction on the 8-bit image data of CMYK subjected to gamma correction and the 8-bit image data of clear toner plane to attach a clear toner (step S5). Subsequently, the halftone engine 56 converts the 8-bit image data of CMYK and the 8-bit image data of clear toner plane into 2-bit image data by halftone processing (step S6).

Next, the DFE 50 outputs the 2-bit image data generated in step S6 and On-Off information indicating ON/OFF of the glosser 80 determined in step S4, to the MIC 60 (step S7).

Also, in step S5, in a case where the clear processing 54 does not generate the image data of clear toner plane, in step S7, only the 2-bit image data of CMYK is output to the MIC 60.

Here, specific examples based on surface effect types will be explained. Here, an explanation is given to various types, that is, the premium gloss and the gloss to give the glaze and the matt and the premium matt to suppress the glaze. Also, a case will be explained below where the identical type is designated in one page. In step S4, using the density value of each pixel of the 8-bit glaze control plane, with reference to the surface effect selection table exemplified in FIG. 15, the clear processing 54 of the DFE 50 decides that a surface effect designated with respect to pixels of density values "238" to "255" is the premium gloss. In this case, further, the DFE 50 decides whether the area in which the premium gloss is designated as a surface effect corresponds to the whole area defined by the image data. In a case where the decision result is positive, the DFE 50 generates an inverse mask by, for example, Equation (1), using the image data corresponding to the area in the 8-bit image data of CMYK subjected to gamma correction. What represents the inverse mask denotes the image data of clear toner plane used in the printer machine 70. Also, the low-temperature fixing machine 90 does not use the image data of clear toner plane in the area, and therefore the DFE 50 does not generate the image data of clear toner plane used in the low-temperature fixing machine 90. Subsequently, in step S7, the DFE 50 outputs the 2-bit image data of clear toner plane used in the printer machine 70, the 2-bit image data of CMYK subjected to halftone processing acquired in step S3 and the On-Off information indicating ON of the glosser 80, to the MIC 60. The MIC 60 outputs the image data of CMYK color planes and the image data of clear toner plane used in the printer machine 70, which are the image data output from the DFE 50, to the printer machine 70, and turns on the glosser 80 using the On-Off information output from the DFE 50. The printer machine 70 uses the image data of CMYK color planes and the image data of clear toner plane which are output from the MIC 60, forms a toner image based on each toner on the photosensitive drum by radiating an optical beam from the exposing unit, transfers this to a transfer paper and fixes this by heating and pressurization at a normal temperature. By this means, the clear toner is attached to the transfer paper in addition to the CMYK toners, and the image is formed. After that, the glosser 80 refixes the transfer paper at high temperature and high pressure. Since the image data of clear toner plane is not output to the low-temperature fixing machine 90, the clear toner is not attached and the transfer paper is ejected in the low-temperature fixing machine 90. As a result of this, the total attachment amount of the CMYK toners and the clear toner in the whole area defined by the image data is uniformly compressed, and therefore strong glaze is acquired from the surface of the area.

Meanwhile, in a case where the area in which the premium gloss is designated as a surface effect corresponds to part of the area defined by the image data, the following problem may occur. First, in the area in which the premium gloss is designated, the image data of clear toner plane representing the above inverse mask is used. However, in a case where the total attachment value of CMYK toners with respect to the other pixels is set to be equal to or greater than a predetermined value, if it is refixed in the glosser 80, as a result, the total attachment amount of the CMYK toners and the clear toner is uniform in the area in which the premium gloss is designated and the area in which the total attachment value of CMYK toners is set to be equal to or greater than the predetermined value.

For example, in a case where the total attachment value of CMYK toners is set to be equal to or greater than a predetermined value with respect to all pixels forming an area defined by the image data, it results in that the premium gloss is designated with respect to the whole area defined by the image data.

By this means, when an area in which the premium gloss is designated as a surface effect corresponds to part of an area defined by image data, the DFE 50 generates image data of clear toner plane similar to one in which the premium gloss is designated with respect to the whole area defined by image data, and, after a clear toner is attached to a transfer paper, it is refixed in the glosser 80. Next, with respect to the transfer paper refixed in the glosser 80, to give a surface effect of the premium matt to other areas than the area in which the premium gloss is designated as a surface effect, the image data of clear toner plane used in the low-temperature fixing machine 90 is generated.

To be more specific, similar to the above, the DFE 50 generates the inverse mask by Equation (1) as the image data of clear toner used in the printer machine 70. Further, with respect to other areas than the area in which the premium gloss is designated as a surface effect, the DFE 50 generates the mask by Equation (2) as the image data of clear toner plane used in the low-temperature fixing machine 90. Subsequently, in step S7, the DFE 50 outputs the image data of clear toner plane used in the printer machine 70, the image data of clear toner plane used in the low-temperature fixing machine 90, the 2-bit image data of CMYK subjected to halftone processing acquired in step S6 and the On-Off information indicating ON of the glosser 80, to the MIC 60.

The MIC 60 outputs the image data of CMYK color planes and the image data of clear toner plane used in the printer machine 70 in the image data output from the DFE 50, to the printer machine 70, turns on the glosser 80 using the On-Off information output from the DFE 50, and outputs the image data of clear toner plane used in the low-temperature fixing machine 90 in the image data output from the DFE 50, to the low-temperature fixing machine 90. The printer machine 70 uses the image data of CMYK color planes and the image data of clear toner plane, which are output from the MIC 60, and forms an image, to which the CMYK toners and the clear toner are attached, on a transfer paper. By this means, the glosser 80 refixes the transfer paper at high temperature and high pressure. The low-temperature fixing machine 90 forms a toner image by the clear toner using the image data of clear toner plane output from the MIC 60, overlaps the toner image over a transfer paper passing the glosser 80 and fixes it to the transfer paper at low-temperature heating and pressurization. As a result of this, in the area in which the premium gloss is designated, the total attachment amount of the CMYK toners and the clear toner is uniformly compressed, and therefore strong glaze is acquired from the surface of the area. Meanwhile, in other areas than the area in which the premium gloss is designated, the surface asperity is caused by attachment of the clear toner by a mask after the pressurization in the glosser 80, and the glaze on the surface of the area is suppressed.

Also, in step S4, using the density value of each pixel of the 8-bit glaze control plane, with reference to the surface effect selection table, the clear processing 54 of the DFE 50 decides that a surface effect designated with respect to pixels of density values "212" to "232" is the premium gloss, especially, a surface effect designated with respect to pixels of density values "228" to "232" is gloss type 1. In this case, the clear processing 54 of the DFE 50 generates inverse mask 1 using the image data corresponding to the area in the 8-bit image data of CMYK subjected to gamma correction. What represents the inverse mask 1 denotes the image data of clear toner plane used in the printer machine 70. Also, the low-temperature fixing machine 90 does not use the image data of clear toner plane in the area, and therefore the DFE 50 does not generate the image data of clear toner plane used in the low-temperature fixing machine 90. Subsequently, in step S7, the DFE 50 outputs the image data of clear toner plane used in the printer machine 70, the 2-bit image data of CMYK subjected to halftone processing acquired in step S6 and the On-Off information indicating OFF of the glosser 80, to the MIC 60. The MIC 60 outputs the image data of CMYK color planes and the image data of clear toner plane used in the printer machine 70, which are the image data output from the DFE 50, to the printer machine 70, and turns off the glosser 80 using the On-Off information output from the DFE 50. The printer machine 70 uses the image data of CMYK color planes and the image data of clear toner plane used in the printer machine 70, which are output from the MIC 60, and forms an image, to which the CMYK toners and the clear toner are attached, on a transfer paper. Since the glosser 80 is turned off, after that, the transfer paper is not refixed at high temperature and high pressure. Also, since the image data of clear toner plane is not output to the low-temperature fixing machine 90, the clear toner is not attached and the transfer paper is elected in the low-temperature fixing machine 90. As a result of this, the total attachment amount of the CMYK toners and the clear toner in the area in which the premium gloss is designated as a surface effect is relatively uniform, and strongish glaze is acquired from the surface of the area.

Also, in step S4, using the density value of each pixel of the 8-bit glaze control plane, with reference to the surface effect selection table, the clear processing 54 of the DFE 50 decides that a surface effect designated with respect to pixels of density values "23" to "43" is the matt. In this case, the DFE 50 generates image data representing a halftone, as the image data of clear toner plane used in the printer machine 70. Also, the low-temperature fixing machine 90 does not use the image data of clear toner plane in the area, and therefore the DFE 50 does not generate the image data of clear toner plane used in the low-temperature fixing machine 90. Subsequently, in step S7, the DFE 50 outputs the 2-bit image data of clear toner plane used in the printer machine 70, the 2-bit image data of CMYK subjected to halftone processing acquired in step S6 and the On-Off information indicating ON of the glosser 80, to the MIC 60. The MIC 60 outputs the image data of CMYK color planes and the image data of clear toner plane used in the printer machine 70, which are the image data output from the DFE 50, to the printer machine 70, and turns off the glosser 80 using the On-Off information output from the DFE 50. The printer machine 70 uses the image data of CMYK color planes and the image data of clear toner plane, which are output from the MIC 60, and forms an image, to which the CMYK toners and the clear toner are attached, on a transfer paper. Since the glosser 80 is turned off, after that, the transfer paper is not refixed at high temperature and high pressure. Also, since the image data of clear toner plane is not output to the low-temperature fixing machine 90, the clear toner is not attached and the transfer paper is ejected in the low-temperature fixing machine 90. As a result of this, the surface asperity is caused by attachment of the halftone by the clear toner in the area in which the matt is designated as a surface effect, and the glaze on the surface of the area is slightly suppressed.

Also, in step S4, using the density value of each pixel of the 8-bit glaze control plane, with reference to the surface effect selection table, the clear processing 54 of the DFE 50 decides that a surface effect designated with respect to pixels of density values "1" to "17" is the premium matt. In this case, when a different surface effect is designated in one page (which will be described later), ON/OFF of the glosser 80 is set according to the setting, and, regardless of ON or OFF, the clear processing 54 of the DFE 50 does not generate the image data of clear toner plane used in the printer machine 70 and generates a mask as the 2-bit image data of clear toner plane used in the low-temperature fixing machine 90. Subsequently, in step S7, the DFE 50 outputs the image data of clear toner plane used in the low-temperature fixing machine 90, the 2-bit image data of CMYK subjected to halftone processing acquired in step S6 and the On-Off information indicating ON/OFF of the glosser 80, to the MIC 60. The MIC 60 outputs the image data of CMYK color planes in the image data output from the DFE 50, to the printer machine 70, and outputs the image data of clear toner plane used in the low-temperature fixing machine 90 in the image data output from the DFE 50, to the low-temperature fixing machine 90. The printer machine 70 uses the image data of CMYK color planes output from the MIC 60 and forms an image, to which the CMYK toners are attached, on a transfer paper. In a case where the glosser 80 is turned on, the transfer paper is refixed at high temperature and high pressure in the glosser 80, and, in a case where the glosser 80 is tuned off, the transfer paper is not refixed at high temperature and high pressure. The low-temperature fixing machine 90 forms a toner image by the clear toner using the image data of clear toner plane output from the MIC 60, overlaps the toner image over a transfer paper passing the glosser 80 and fixes it to the transfer paper at low-temperature heating and pressurization. As a result of this, in the area in which the premium matt is designated, the surface asperity is caused by attachment of the clear toner by a mask, and the glaze on the surface of the area is suppressed.

Although a case has been described above where the identical surface effect is designated in one page, even in a case where different types of surface effects are designated in one page, it can be similarly realized by the above processing. That is, in a case where a plurality of surface effects are designated in one page, in image data of glaze control plane, the density values corresponding to the surface effect types illustrated in FIG. 15 are set to pixels of areas to which various surface effects are assigned. That is, in the glaze control plane, an area to which the surface effect is assigned is designated every surface effect type, and therefore, in the image data of this glaze control plane, the DFE 50 may decide a range of pixels in which the identical density value is set, as an area to which the identical surface effect is assigned, and can easily realize each surface effect in one page.

However, in a case where multiple types of surface effects are designated in one page by density values in the image data of glaze control plane, it is not possible to ON/OFF of the glosser 80 in the identical page, and therefore there are surface effect types that can be realized at the same time and surface effect types that cannot be realized at the same time.

As illustrated in FIG. 1, in the present embodiment adopting a configuration including the printer machine 70, the glosser 80 and the low-temperature fixing machine 90, in a case where surface effects of the premium gloss (PG) and the premium matt (PM) are designated in one page, referring to FIG. 15, since the glosser 80 is tuned on in the premium gloss (PG) and ON/Off of the glosser 80 is decided based on designation of other surface effects in the page in the premium matt (PM), it is possible to realize these two surface effect types in one page at the same time.

In this case, in step S4, using the density value of each pixel of the 8-bit glaze control plane, with reference to the surface effect selection table exemplified in FIG. 15, the clear processing 54 of the DFE 50 decides that a surface effect designated with respect to a pixel area of density values "238" to "255" is the premium gloss (PG). Subsequently, the clear processing 54 of the DFE 50 generates an inverse mask by, for example, Equation (1), using the image data corresponding to the area in the 8-bit image data of CMYK subjected to gamma correction. What represents the inverse mask denotes the image data of clear toner plane used in the printer machine 70 with respect to the area in which a surface effect of the premium gloss (PG) is designated. Also, the low-temperature fixing machine 90 does not use the image data of clear toner plane in the area in which the premium gloss is designated, and therefore the DFE 50 does not generate the image data of clear toner plane used in the low-temperature fixing machine 90 with respect to the area in which the premium gloss is designated.

Also, in step S4, in the same page as above, with reference to the surface effect selection table in the same way, the clear processing 54 of the DFE 50 decides that a surface effect designated with respect to a pixel area of density values "1" to "17" is the premium matt (PM). In this case, the clear processing 54 of the DFE 50 uses On-Off information to turn on the glosser 80 according to the setting of the premium gloss, which is a different surface effect in one page, does not generate the image data of clear toner plane used in the printer machine 70 with respect to the area in which the premium matt is designated, and generates a mask with respect to the area in which the premium matt is designated, as the image data of clear toner plane used in the low-temperature fixing machine 90.

Subsequently, in step S7, the 2-bit image data of clear toner plane used in the printer machine 70 with respect to the area in which the premium gloss is designated, the 2-bit image data of clear toner plane used in the low-temperature fixing machine 90 with respect to the area in which the premium matt is designated, the 2-bit image data of CMYK subjected to halftone processing acquired in step S6 and the On-Off information indicating ON of the glosser 80, are output to the MIC 60.

The MIC 60 outputs the image data of CMYK color planes in the image data output from the DFE 50 and the image data of clear toner plane used in the printer machine 70 with respect to the area in which the premium gloss is designated, to the printer machine 70. Also, in the image data output from the DFE 50, the MIC 60 outputs to the low-temperature fixing machine 90 the image data of clear toner plane used in the low-temperature fixing machine 90 with respect to the area in which the premium matt is designated, and turns on the glosser 80 using the On-Off information output from the DFE 50.

The printer machine 70 uses the image data of CMYK color planes and the image data of clear toner plane with respect to the area in which the premium gloss is designated, which are output from the MIC 60, forms a toner image based on each toner on a photosensitive drum by radiating an optical beam from an exposing unit, transfers this to a transfer paper and fixes this by heating and pressurization at a normal temperature. By this means, the clear toner is attached to the transfer paper in addition to the CMYK toners, and the image is formed. After that, the glosser 80 refixes the transfer paper at high temperature and high pressure.

The low-temperature fixing machine 90 forms a toner image by the clear toner using the image data of clear toner plane with respect to the area in which the premium matt is designated, which is output from the MIC 60, overlaps the toner image over a transfer paper passing the glosser 80 and fixes it to the transfer paper at low-temperature heating and pressurization. As a result, strong glaze is acquired from the surface of the area in which the premium gloss is designated as a surface effect, and, in the area in which the premium matt is designated as a surface effect, the surface asperity is caused by attachment of the clear toner by a mask and the glaze on the surface of the area is suppressed.

Furthermore, in the configuration in the present embodiment, in a case where surface effects of the gloss (G), the matt (M) and the premium matt (PM) are designated in one page, referring to FIG. 15, since the glosser 80 is turned off in the gloss (G) and the matt (M) and ON/OFF of the glosser 80 is decided based on designation of other surface effects in the page in the premium matt (PM), it is possible to these three surface effect types in one page at the same time.

This case will be explained in more detail. In step S4, using the density value of each pixel of the 8-bit glaze control plane, with reference to the surface effect selection table, the clear processing 54 of the DFE 50 decides that a surface effect designated with respect to a pixel area of density values "212" to "232" is the premium gloss, especially, a surface effect designated with respect to pixels of density values "228" to "232" is gloss type 1. In this case, the clear processing 56 of the DFE 50 generates the inverse mask 1 using the image data corresponding to the area in the 8-bit image data of CMYK subjected to gamma correction. What represents the inverse mask 1 denotes the image data of clear toner plane used in the printer machine 70 with respect to the area in which the gloss is designated. Also, the low-temperature fixing machine 90 does not use the image data of clear toner plane with respect to the area in which the gloss is designated, and therefore the DFE 50 does not generate the image data of clear toner plane used in the low-temperature fixing machine 90.

Also, in step S4, in the same page as above, with reference to the surface effect selection table in the same way, the clear processing 54 of the DFE 50 decides that a surface effect designated with respect to a pixel area of density values "23" to "43" is the matt (M). In this case, the clear processing 54 of the DFE 50 generates image data representing a halftone, as the image data of clear toner plane used in the printer machine 70 with respect to the area in which the matt is designated. Also, the low-temperature fixing machine 90 does not use the image data of clear toner plane with respect to the area in which this matt is designated, and therefore the DFE 50 does not generate the image data of clear toner plane used in the low-temperature fixing machine 90.

Further, in step S4, in the same page as above, with reference to the surface effect selection table in the same way, the clear processing 54 of the DFE 50 decides that a surface effect designated with respect to a pixel area of density values "1" to "17" is the premium matt (PM). In this case, regarding ON/Off of the glosser 80, the clear processing 54 of the DFE 50 turns it off according to the setting of the gloss and the matt, which are other surface effects designated in one page, does not generate the image data of clear toner plane used in the printer machine 70 with respect to the area in which the premium matt is designated, and generates a mask with respect to the area in which the premium matt is designated, as the image data of clear toner plane used in the low-temperature fixing machine 90.

Subsequently, in step S7, the 2-bit image data of clear toner plane used in the printer machine 70 with respect to the area in which the gloss is designated, the 2-bit image data of clear toner plane used in the printer machine 70 with respect to the area in which the matt is designated, the image data of clear toner plane used in the low-temperature fixing machine 90 with respect to the area in which the premium matt is designated, the 2-bit image data of CMYK subjected to halftone processing acquired in step S3 and the On-Off information indicating OFF of the glosser 80, are output to the MIC 60 by the si3 unit of the DFE 50.

The MIC 60 outputs the image data of CMYK color planes, the image data of clear toner plane used in the printer machine 70 with respect to the area in which the gloss is designated, and the image data of clear toner plane used in the printer machine 70 with respect to the area in which the matt is designated, which are the image data output from the DFE 50, to the printer machine 70, and turns off the glosser 80 using the On-Off information output from the DFE 50. Also, in the image data output from the DFE 50, the MIC 60 outputs to the low-temperature fixing machine 90 the image data of clear toner plane used in the low-temperature fixing machine 90 with respect to the area in which the premium matt is designated.

The printer machine 70 forms an image, to which the CMYK toners and the clear toner are attached, on a transfer paper, using the image data of CMYK color planes, the image data of clear toner plane used in the printer machine 70 with respect to the area in which the gloss is designated, and the image data of clear toner plane used in the printer machine 70 with respect to the area in which the matt is designated, which are output from the MIC 60. Since the glosser 80 is turned off, after that, the transfer paper is not refixed at high temperature and high pressure.

Also, the low-temperature fixing machine 90 forms a toner image by the clear toner with respect to the area of the premium mat, using the image data of clear toner plane with respect to the area in which the premium matt is designated, which is output from the MIC 60, overlaps the toner image over the transfer paper and fixes it to the transfer paper at low-temperature heating and pressurization.

As a result, in an area in which the gloss is designated as a surface effect in one page, the total attachment amount of the CMYK toners and the clear toner is relatively uniform, and strongish glaze is acquired from the surface of the area. Also, in an area in which the matt is designated as a surface effect in one page, attaching a halftone by the clear toner, the surface asperity is caused and the glaze on the surface of the area is slightly suppressed. Further, in an area in which the premium matt is designated as a surface effect in one page, the surface asperity is caused by attachment of the clear toner by a mask and the glaze on the surface of the area is suppressed.

Thus, in a case where multiple types of surface effects are designated in the identical page and it is not necessary to switch ON/OFF of the glosser 80 according to a surface effect, it is possible to realize the multiple surface effects in one page, while, in one page, it is not possible to realize multiple different surface effects in which it is necessary to switch ON/OFF of the glosser 80 in the identical page.

For example, in the present embodiment adopting a configuration including the printer machine 70, the glosser 80 and the low-temperature fixing machine 90, in a case where the premium gloss (PG) and the gloss (G) are designated in one page, referring to FIG. 15, since the glosser 80 is tuned on in the premium gloss (PG) and the glosser 80 is turned off in the gloss (G), it is not possible to realize these two surface effect types of the premium gloss (PG) and the gloss (G) in one page.

Thus, although different surface effect types are designated in one page, if they cannot be realized in one page, in the present embodiment, regarding part of surface effect types that cannot be realized at the same time, the DFE 50 realizes it by using a surface effect different from a designated surface effect as a substitute.

Figure 23:
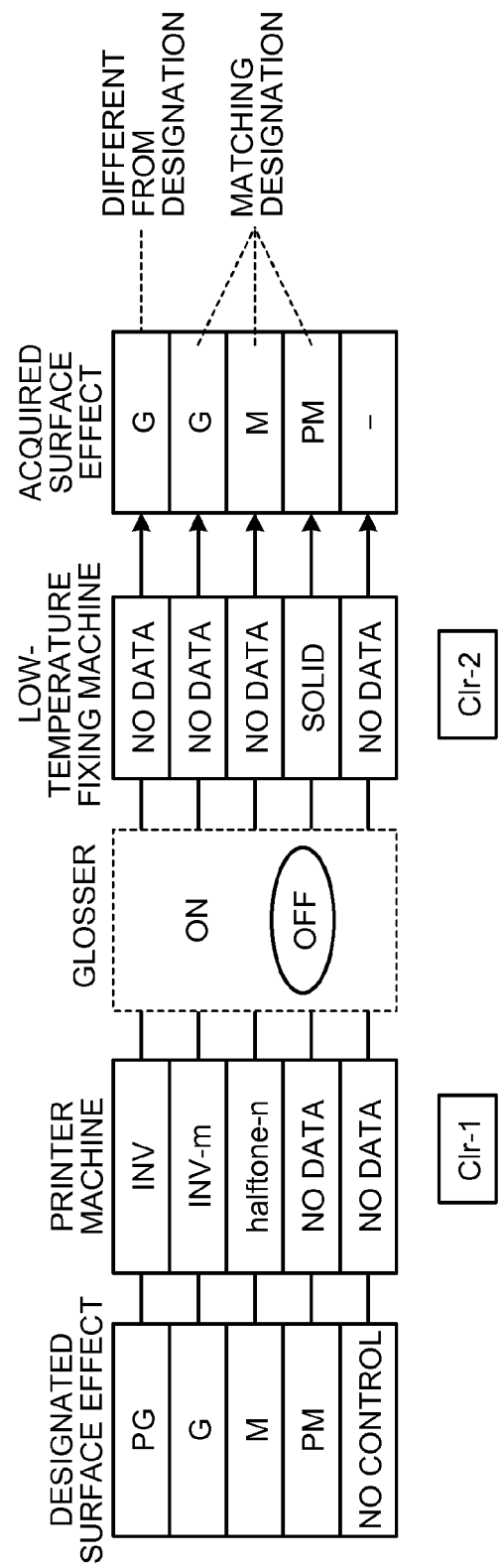
FIG. 23 is a view illustrating the comparison between types of designated surface effects, image data of clear toner planes used in a printer machine 70, image data of clear toner planes used in a low-temperature fixing machine 90 and actually acquired surface effects.

For example, as exemplified in FIG. 23, in a case where four effects of the premium gloss (PG), the gloss (G), the matt (M) and the premium matt (PM) are designated in the identical pate, the DFE 50 turns off the glosser 80. Further, by the density values of the glaze control plane, in areas in which the gloss, the matt and the premium matt are decided as surface effects, the DFE 50 realizes each surface effect, and, in an area in which the premium gloss is decided as a surface effect, selects the gloss as an alternate surface effect. Subsequently, in the area in which the premium gloss is decided as a surface effect, similar to the case of the gloss, the DFE 50 generates one of inverse masks A, B and C as the image data of clear toner plane used in the printer machine 70, using the image data corresponding to the area in the 8-bit image data of CMYK subjected to gamma correction (corresponding to INV in FIG. 23). The image data of clear toner plane used in the low-temperature fixing machine 90 is not generated. In FIG. 15, in the case of density values "248" to "255," it is decided in the DFE 50 that the effect is the premium gloss type A, and the inverse mask A is used. Also, INV-m in FIG. 23 is associated with inverse masks 1 to 4 in FIG. 15, and halftone-n in FIG. 23 is associated with halftones 1 to 4 in FIG. 15. Subsequently, in a transfer paper ejected via the printer machine 70, the glosser 80 turned off and the low-temperature fixing machine 90 as described above, the gloss is assigned as a surface effect in the areas in which the premium gloss and the gloss are designated, the matt is assigned as a surface effect in the area in which the matt is designated, and the premium matt is assigned as a surface effect in the area in which the premium matt is designated. Also, in the area that is not designated as an area in which a surface effect is assigned, no surface effect is assigned.

As described above, using the glaze control plane in which a density value is set based on a surface effect type designated by the user, the DFE 50 decides whether there is post-processing in a post-processor, depending on whether there is a post-processor such as the glosser 80 and the low-temperature fixing machine 90 connected to the printer machine 70 and on its type, and adequately generates image data of clear toner plane to attach a clear toner. By this means, it is possible to generate the image data of clear toner plane to give a common surface effect in image forming systems of various structures, and, by attaching the clear toner toe an image formed by the toner images of CMYK using the image data of clear toner plane, it is possible to give various types of surface effects. Therefore, the user can give a desired surface effect by the clear toner to a print material on which an image is formed, without troubles.

Also, in the present embodiment, a density value to specify a surface effect is set every pixel of the image data of glaze control plane, it is possible to give multiples types of surface effects in one paper page.

A control program executed in the DFE 50 according to the first embodiment has a module structure including the above units (including the rendering engine 51, the CMM 52, the TRC 53, the clear processing 54, the total toner amount restriction unit 55 (including the stored color setting unit 243, the setting display unit 244 and the determination unit 245), the halftone engine 56 and the UI unit 57), and, as actual hardware, by reading and executing the control program from the above storage media in a CPU (processor), the above units are loaded on a main storage device, and the rendering engine 51, the CMM 52, the TRC 53, the clear processing 54, the total toner amount restriction unit 55, the halftone engine 56 and the UI unit 57 are produced on the main storage device. Also, in the above embodiment, the DFE 50 (or the total toner amount restriction unit 55) performs the restriction processing according to an aspect of the present invention, a control device type to perform the restriction processing according to an aspect of the present invention is not limited to this but is arbitrary. For example, it is possible to perform the restriction processing on the side of the host device 10.

Second Embodiment

In the above first embodiment, although it is configured such that the above restriction processing is performed in the DFE 50, it is not limited to this.

That is, a configuration is possible in which one of the multiple processings performed in one device is performed in at least one different device connected to the one device via a network.

As its example, the print system according to the present embodiment mounts one of DEF functions on a server device on a network.

Figure 24:
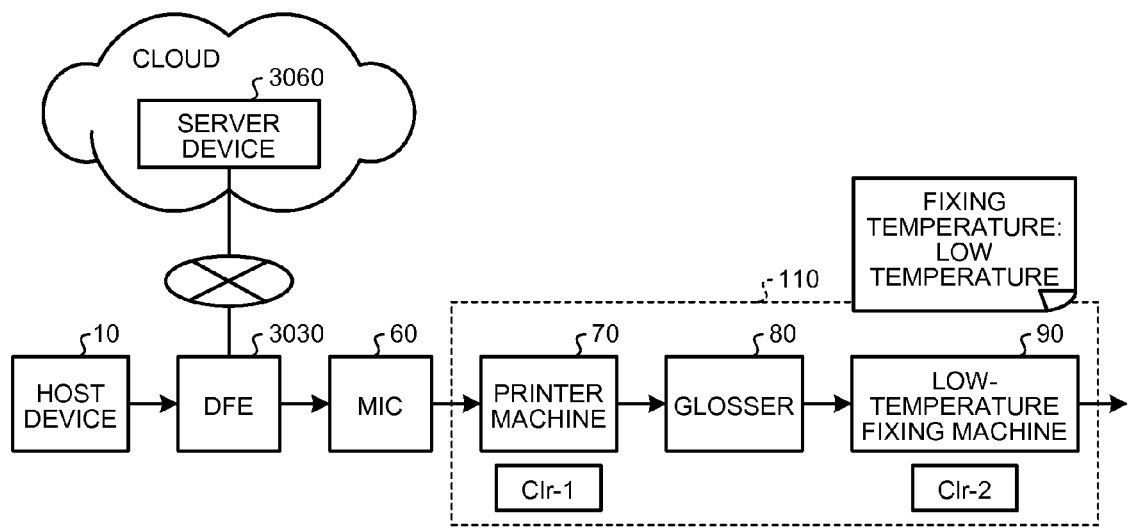
FIG. 24 is a view exemplifying a configuration of a print system according to a second embodiment.

FIG. 24 is a view exemplifying a structure of the print system according to the present embodiment. As illustrated in FIG. 24, the print system according to the present embodiment includes the host device 10, a DFE 3030, the MIC 60 and a print device 110.

The present embodiment adopts a configuration in which the DFE 3030 is connected to a server device 3060 via a network such as the Internet. Also, the present embodiment adopts a configuration in which the function of the total toner amount restriction unit 55 of the DFE 50 according to the first embodiment is set in the server device 3060.

That is, to be more specific, the present embodiment adopts a configuration in which the DFE 3030 is connected to the single server device 3060 via a network (cloud) such as the Internet, the function of the total toner amount restriction unit 55 of the DFE 50 according to the first embodiment is mounted on the server device 3060 and the above restriction processing is performed in the server device 3060.

Figure 25:
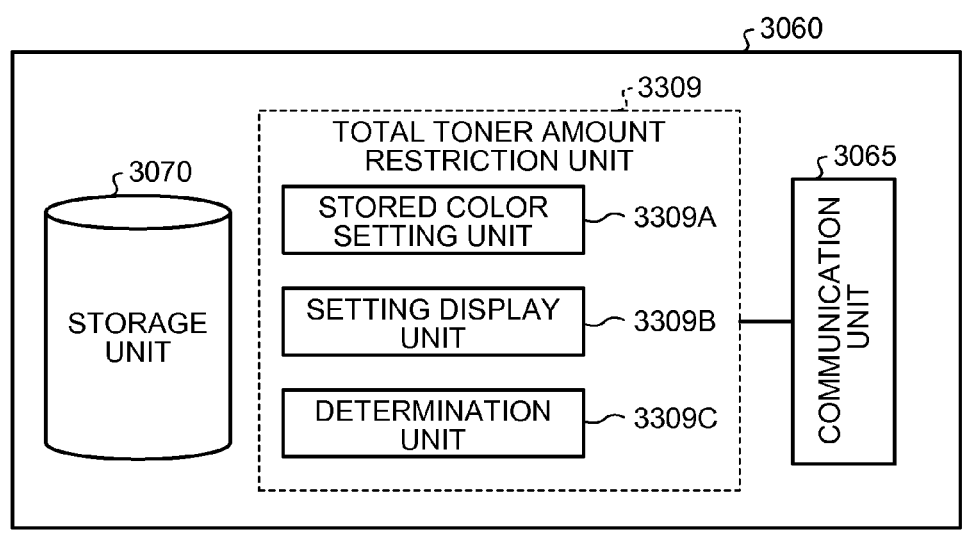
FIG. 25 is a block diagram illustrating a functional configuration of a server device according to the second embodiment.

First, an explanation will be given with respect to the server device 3060. FIG. 25 is a block diagram illustrating a functional configuration of the server device 3060 according to the present embodiment. The server device 3060 mainly includes a storage unit 3070, a total toner amount restriction unit 3309 and a communication unit 3065. Also, the total toner amount restriction unit 3309 includes a stored color setting unit 3309A, a setting display unit 3309B and a determination unit 3309C.

The storage unit 3070 is a storage medium such as an HDD and memory. The communication unit 3065 transmits/receives various kinds of data to/from the DFE 3030. To be more specific, the communication unit 3065 receives image data of CMYK plane, image data of clear toner plane, the above object information and the above specification information from the DFE 3030. Also, the communication unit 3065 transmits image data created in the total toner amount restriction unit 3309 (i.e. image data of CMYKClr planes acquired by restriction processing) to the DFE 3030.

Also, a function of the total toner amount restriction unit 3309 is similar to that of the total toner amount restriction unit 55 according to the first embodiment.

Figure 26:
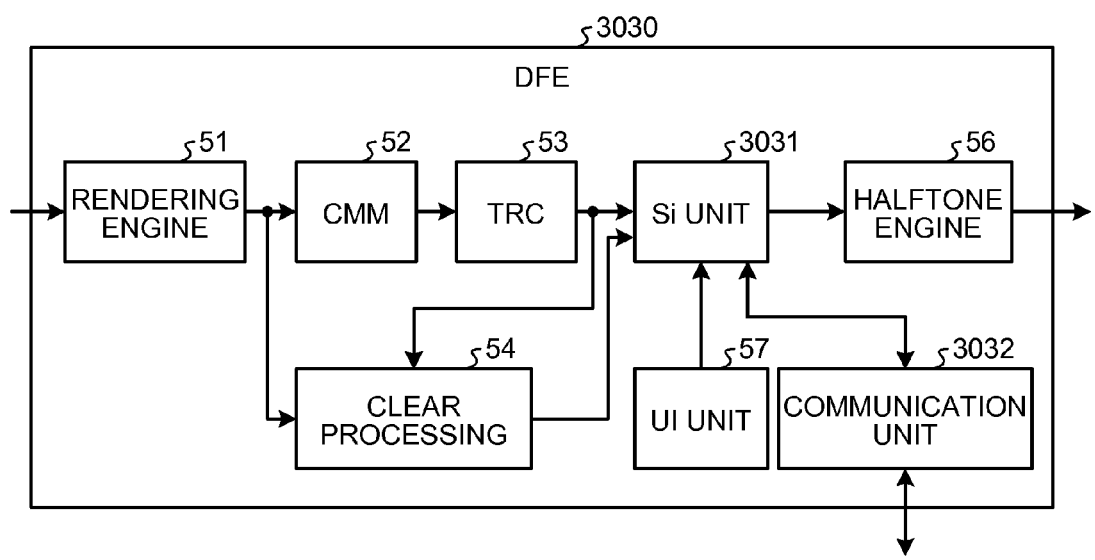
FIG. 26 is a block diagram illustrating a functional configuration of a DFE according to the second embodiment.

Next, the DFE 3030 will be explained. FIG. 26 is a block diagram illustrating a functional configuration of the DFE 3030 according to the present embodiment. The DFE 3030 according to the present embodiment mainly includes the rendering engine 51, the CMM 52, the TRC 53, the clear processing 54, the UI unit 57, an Si unit 3031, a communication unit 3032 and the halftone engine 56. The functions and configurations of the rendering engine 51, the CMM 52, the TRC 53, the clear processing 54, the UI unit 57 and the halftone engine 56 are similar to the DFE 50 according to the first embodiment.

The Si unit 3031 accepts an input of image data of CMYK planes output from the TRC 53, image data of clear toner plane output from the clear processing 54, the above object information output from the rendering engine 51 and the above specification information output from the UI unit 57. The communication unit 3032 transmits/receives various kinds of data such as the image data of CMYK planes, the image data of clear toner plane, the object information and the specification information, which are input in the Si unit 3031, to/from the server device 3060.

Figure 27:
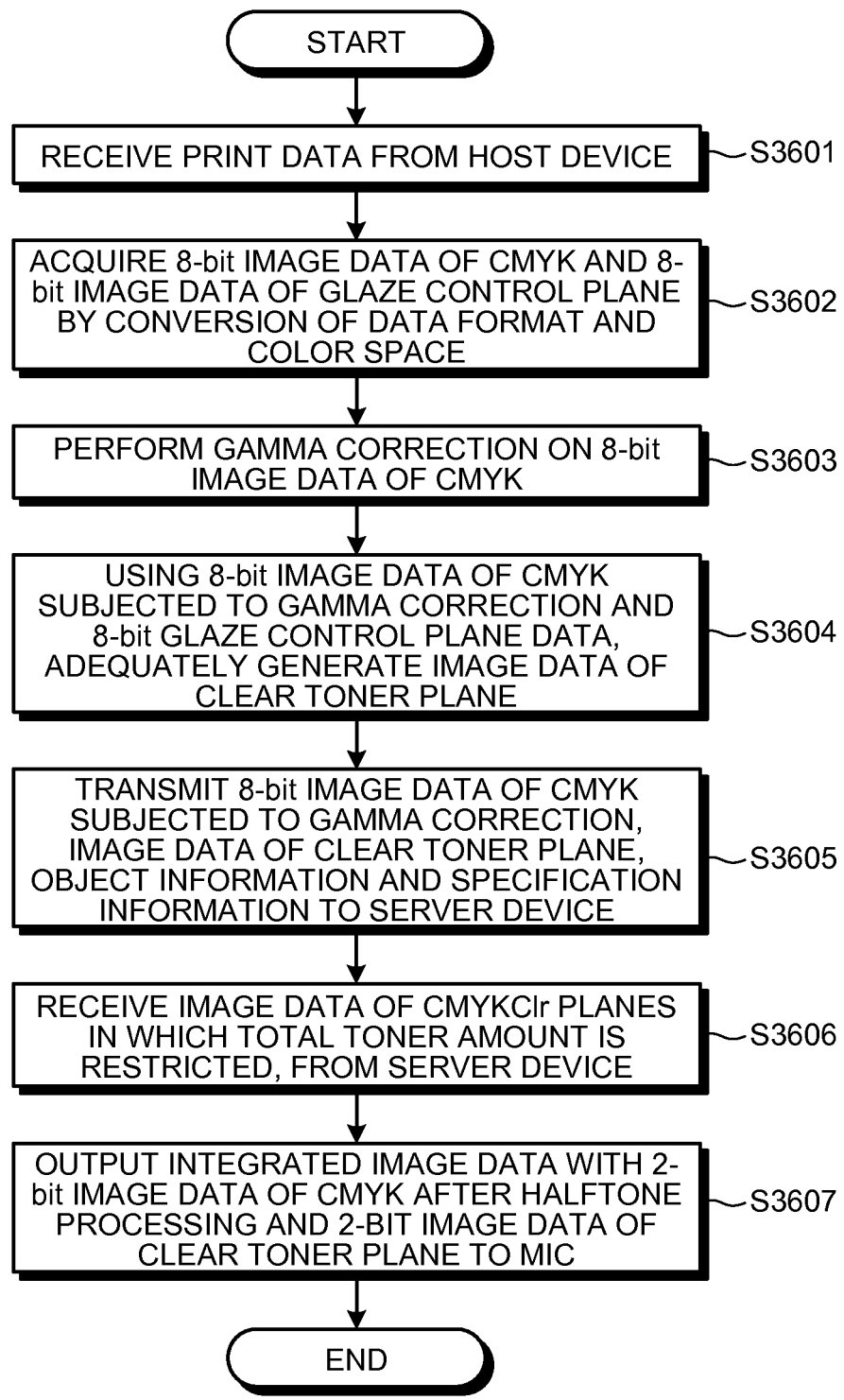
FIG. 27 is a flowchart illustrating an example of processing by the DFE according to the present embodiment.

Next, steps of glaze control processing performed in the image forming system according to the present embodiment will be explained using FIG. 27.

When the DFE 3030 receives print data from the host device 10 (step S3601), the rendering engine 51 linguistically interprets this, converts the image data expressed in the vector format into the raster format, converts the color space expressed in the RGB format into the color space in the CMYK format and acquires 8-bit image data of CMYK color planes and 8-bit image data of glaze control plane (step S3602).

Next, when the 8-bit image data of glaze control plane is output, the TRC 53 of the DFE 3030 performs gamma correction on the 8-bit image data of CMYK color planes by a gamma curve of 1D_LUT generated by calibration (step S3603).

Next, the clear processing 54 of the DFE 3030 adequately generates the image data of clear toner plane using the 8-bit image data of CMYK subjected to gamma correction and the 8-bit image data of glaze control plane (step S3604). To be more specific, similar to the above first embodiment, the clear processing 54 uses the input image data of glaze control plane and decides a surface effect with respect to the density value (i.e. pixel value) of each pixel forming the image data of glaze control plane, and, based on the decision, by determining ON/OFF of the glosser 80 and adequately generating an inverse mask or mask using the input 8-bit image data of CMYK subjected to gamma correction, adequately generates the image data of clear toner plane (i.e. image data of Clr plane) to attach a clear toner.

Subsequently, the Si unit 3031 transmits the 8-bit image data of CMYK subjected to gamma correction, the image data of clear toner plane, the object information and the specification information to the server device 3060 via the communication unit 3032 (step S3605).

Figure 28:
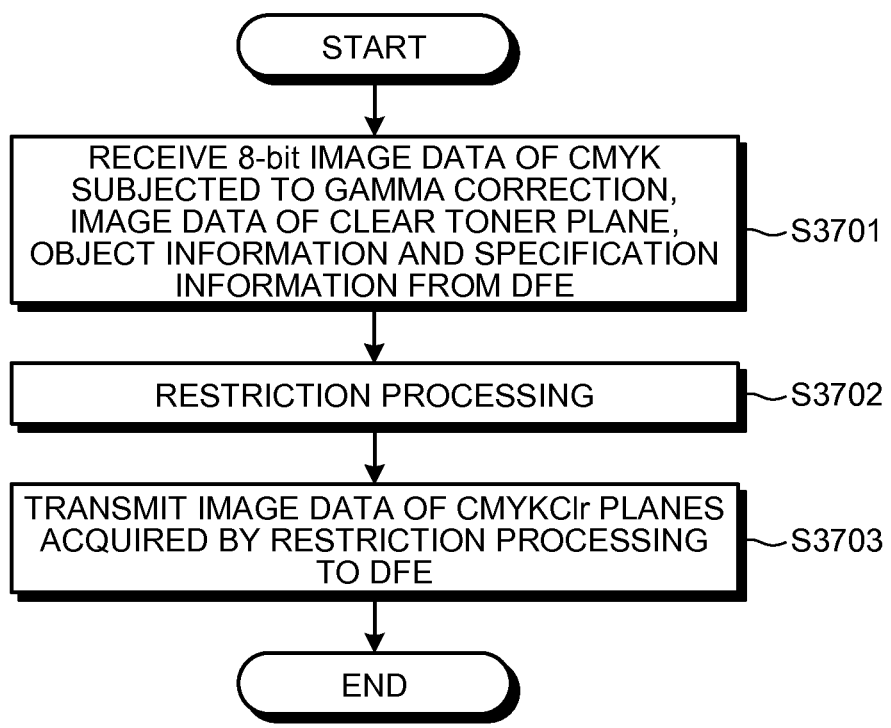
FIG. 28 is a flowchart illustrating an example of processing in a server device according to the second embodiment.

Here, the restriction processing in the server device 3060 will be explained. FIG. 28 is a flowchart for explaining the restriction processing in the server device 3060. As illustrated in FIG. 28, when the 8-bit image data of CMYK subjected to gamma correction, the image data of clear toner plane, the object information and the specification information are received (step S3701), the total toner amount restriction unit 3309 of the server device 3060 performs restriction processing (step S3702). Content of the restriction processing performed in the total toner amount restriction unit 3309 is similar to the restriction processing performed in the total toner amount restriction unit 55 of the DFE 50 according to the above first embodiment. Subsequently, the communication unit 3065 transmits the image data of CMYKClr (image data of CMYKClr planes in which the total toner amount is restricted) acquired by the restriction processing in step S3702, to the DFE 3030 (step S3703).

Returning to FIG. 27, an explanation will be given again. After above step S3605, the image data of CMYKClr planes in which the total toner amount is restricted, is received from the server device 3060 (step S3606). The Si unit 3031 outputs the image data of CMYKClr planes received from the server device 3060, to the halftone engine 56, and the halftone engine 56 performs halftone processing on the image data of CMYKClr planes supplied from the Si unit 3031.

Subsequently, the DFE 3030 outputs 2-bit image data subjected to the halftone processing and On-Off information of the glosser 80 determined in step S3604 to the MIC 60 (step S3607).

Thus, the present embodiment adopts a configuration in which part of the DFE functions is set in the server device 3060, and the above restriction processing is performed in the server device 3060 on the cloud. Therefore, in addition to the effect of the first embodiment, even in a case where there are a plurality of DFEs 3030, it is possible to collectively perform restriction processing, which is suitable to a manager.

Also, the present embodiment adopts a configuration in which a restriction processing function is set in the single server device 3060 on the cloud and restriction processing is performed in the server device 3060, it is not limited to this.

For example, a configuration is possible in which two or more server devices are set on the cloud and the above restriction processing is dispersively performed in the two or more server devices.

Also, it is arbitrarily possible to collectively set part or all of the processing performed in the host device 10 and other processing performed in the DFE 3030, on one server device on the cloud or dispersively set them in a plurality of server devices.

In other words, a configuration is possible in which one of multiple processings performed in one device is performed in at least one different device connected to the one device via a network.

Also, in the case of the "configuration in which one of multiple processings performed in one device is performed in at least one different device connected to the one device via a network," the configuration includes data input/output processing performed between one device and different device or between different devices, such as processing of outputting data (information) produced in processing performed in the one device to the different device and processing of inputting the data by the different device.

That is, in a case where there is one different device, the configuration includes data input/output processing performed between the one device and the different device, and, in a case where there are two or more different devices, the configuration includes data input/output processing between the one device and the different devices or between the different devices such as a first different device and a second different device.

Also, in the above second embodiment, although the server device 3060 is set on the cloud, it is not limited to this. For example, a configuration is possible in which one or multiple server devices such as the server device 3060 are set on any network such as the intranet.

Also, the present invention is not limited to the above embodiments and can be embodied by making various changes in an implementation phase without departing from the scope of the invention. Also, various inventions can be made by adequate combinations of multiple components disclosed in each embodiment. For example, several components can be deleted from all components disclosed in the embodiment. Further, components in different embodiments may be adequately combined. Also, various changes exemplified below are possible.

Figures 29, 30:
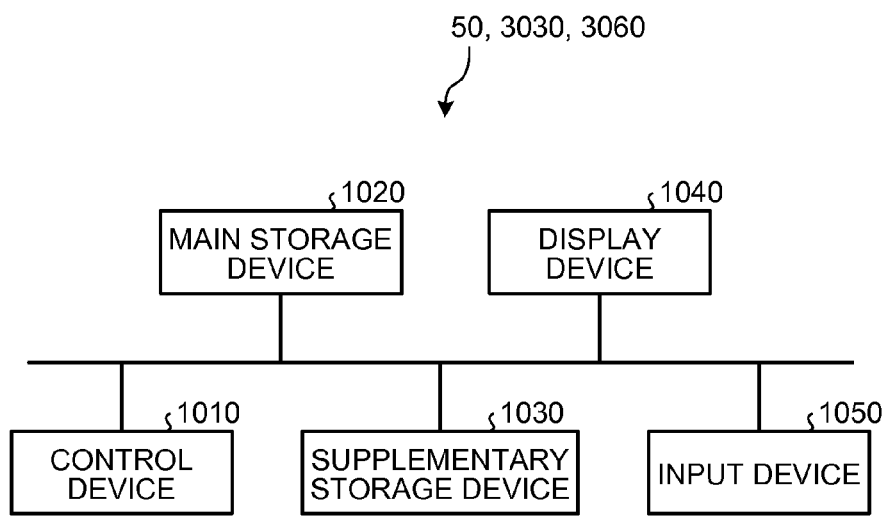
FIG. 29 is a block diagram illustrating a hardware configuration example of a DFE and server device.
FIG. 30 is a view illustrating a display example of the setting results in a stored color setting unit.

FIG. 29 is a block diagram illustrating a hardware configuration example of the DFE 50, the DFE 3030 and the server device 3060 according to the above embodiments. The DFE 50, the DFE 3030 and the server device 3060 according to the present embodiment includes a control device 1010 such as a CPU, a main storage device 1020 such as ROM (Read Only Memory) and RAM, a supplementary storage device 1030 such as an HDD and CD drive device, a display device 1040 such as a display device and an input device 1050 such as a keyboard and mouse, which is a hardware configuration using a normal computer.

Control programs executed in the DFE 50, the DFE 3030 and the server device 3060 according to the above embodiments are recorded and provided in a computer-readable recording medium such as a CD-ROM, flexible disk (FD), CD-R and DVD (Digital Versatile Disk), in an installable format or executable format.

Also, a configuration is possible in which the control programs executed in the DFE 50, the DFE 3030 and the server device 3060 according to the above embodiments are stored in a computer connected to a network such as the Internet, and provided by download via the network. Also, a configuration is possible in which the control programs executed in the DFE 50, the DFE 3030 and the server device 3060 according to the above embodiments are provided or distributed via a network such as the Internet. Also, a configuration is possible in which the control programs executed in the DFE 50, the DFE 3030 and the server device 3060 according to the above embodiments are installed in advance in a ROM or the like and provided.

Also, for example, the user can set a common color as the stored color of each object. As an example, a case is assumed where the user selects Clr as the common stored color of each object. In this case, specification information to specify Clr as the stored color of each object is input in the stored color setting unit 243, and the stored color setting unit 243 sets Clr as the stored color of each object. Subsequently, regarding each object, setting information to instruct restriction processing to be performed using above Equations (15) to (19), output to the determination unit 245. Similar to the above embodiment, the determination unit 245 determines the density value of each color in pixels in each object according to the setting information. FIG. 30 is a view illustrating a display example of the setting result in this case.

As another example, a case is assumed where the user selects K as the common stored color of each object. In this case, specification information to specify K as the stored color of each object is input in the stored color setting unit 243, and the stored color setting unit 243 sets K as the stored color of each object. Subsequently, regarding each object, setting information to instruct restriction processing to be performed using above Equations (5) to (9), is output to the determination unit 245. Similar to the above embodiment, the determination unit 245 determines the density value of each color in pixels in each object according to the setting information. FIG. 31 is a view illustrating a display example of the setting result in this case.

Further, as another example, a case is assumed where the user selects two colors of K and Clr as the common stored colors of each object. In this case, specification information to specify K and Clr as the stored colors of each object is input in the stored color setting unit 243, and the stored color setting unit 243 sets K and Clr as the stored colors of each object. Subsequently, regarding each object, setting information to instruct restriction processing to be performed using the following equations, is output to the determination unit 245.

$$C2 = C1 \times (\text{Limit} - K1 - Clr1)/(C1 + M1 + Y1) \quad (20)$$

$$M2 = M1 \times (\text{Limit} - K1 - Clr1)/(C1 + M1 + Y1) \quad (21)$$

$$Y2 = Y1 \times (\text{Limit} - K1 - Clr1)/(C1 + M1 + Y1) \quad (22)$$

$$K2 = K1 \quad (23)$$

$$Clr2 = Clr1 \quad (24)$$

The determination unit 245 determines the density value of each color in pixels in each object according to the setting information. FIG. 32 is a view illustrating a display example of the setting result in this case. In short, the type or number of stored colors set every object is arbitrary.

Also, in the above embodiment, although image data is formed with the image data of CMYK planes and the image data of clear toner plane, it is not limited to this. For example, the image data may be formed with the image data of CMYK planes, which is a configuration excluding the image data of clear toner plane. Even in this case, a stored color is set according to designation by the user every object, and, regarding an object in which the stored color is set, the density value of each color is determined such that the total sum of the density values of colors other than the stored color in the pixels in the object is within a value subtracting the density value of the stored color from a reference value, and thereby the image data of CMYK planes in which the total toner amount is restricted is generated. In short, the type of image data of the total toner restriction target is arbitrary.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A control device configured to control a print device that forms an image on a recording medium based on image data in which density values of multiple colors are defined every pixel, the image data including data representing different types of objects, the control device comprising:
a stored color setting unit configured to independently set, for a plurality of the objects, color material designation information in response to user input, the color material designation information indicating a unrestricted toner color for a respective object, the non-restricted toner color being one of a plurality of toner colors usable by the print device whose density is unrestricted for the respective object; and
a determination unit configured to determine, for each of the objects, density values of the respective non-restricted toner color based on the color material designation information, such that a total sum of the density values of the plurality of toner colors used to produce the respective object is within a value subtracting a density value of the non-restricted toner color from a reference value.

2. The control device according to claim 1, wherein:
the stored color setting unit does not set the color material designation information with respect to the object in which a unrestricted toner color is not designated; and
the determination unit determines the density values of the colors, regarding the object in which the color material designation information is not set, such that a total sum of the density values of the colors in the pixel in the object is within the reference value.

3. The control device according to claim 1, wherein the image data comprises color plane data as colored image data and clear toner plane data as colorless image data.

4. The control device according to claim 3, further comprising a generation unit configured to generate the clear toner plane based on glaze control plane data to specify a type of a surface effect assigned to a recording medium and an area to which the surface effect is assigned in the recording medium.

5. The control device according to claim 1, wherein the reference value corresponds to an upper limit value of toner from the plurality of toner colors that can be applied to the pixel.

6. The control device according to claim 1, wherein the determination unit does not vary the density value of the non-restricted toner color when adjusting the density values of the colors.

7. An image forming system comprising:
a print device configured to form an image on a recording medium based on image data in which density values of multiple colors are defined every pixel; and
a control device configured to control the print device, the control device including:
a stored color setting unit configured to independently set, for a plurality of the objects, color material designation information in response to user input, the color material designation information indicating a unrestricted toner color for a respective object, the non-restricted toner color being one of a plurality of toner colors usable by the print device whose density is unrestricted for the respective object; and
a determination unit configured to determine, for each of the objects, density values of the respective non-restricted toner color based on the color material designation information, such that a total sum of the density values of the plurality of toner colors used to produce the respective object is within a value subtracting a density value of the non-restricted toner color from a reference value.

8. The image forming system of claim 7, wherein,
the stored color setting unit does not set the color material designation information with respect to the object in which a unrestricted toner color is not designated; and
the determination unit determines the density values of the colors, regarding the object in which the color material designation information is not set, such that a total sum of the density values of the colors in the pixel in the object is within the reference value.

9. The image forming system according to claim 7, wherein the reference value corresponds to an upper limit value of toner from the plurality of toner colors that can be applied to the pixel.

10. The image forming system according to claim 7, wherein the determination unit does not vary the density value of the non-restricted toner color when adjusting the density values of the colors.

11. A computer program product comprising:
a non-transitory computer-usable medium having a program that causes a control device that controls a print device that forms an image on a recording medium based on image data in which density values of multiple colors are defined every pixel, to:
independently set, for a plurality of the objects, color material designation information in response to user input, the color material designation information indicating a unrestricted toner color for a respective object, the non-restricted toner color being one of a plurality of toner colors usable by the print device whose density is unrestricted for the respective object; and
determine, for each of the objects, density values of the respective non-restricted toner color based on the color material designation information, such that a total sum of the density values of the plurality of toner colors used to produce the respective object is within a value subtracting a density value of the non-restricted toner color from a reference value.

12. The computer program product of claim 11, wherein the color material designation information is not set with respect to the object in which a unrestricted toner color is not designated; and the determining determines the density values of the colors, regarding the object in which the color material designation information is not set, such that a total sum of the density values of the colors in the pixel in the object is within the reference value.

13. The computer program product of claim 11, wherein the reference value corresponds to an upper limit value of toner from the plurality of toner colors that can be applied to the pixel.

14. The computer program product of claim 11, wherein the determining does not vary the density value of the non-restricted toner color when adjusting the density values of the colors.

\* \* \* \* \*